United States Patent
Chen et al.

(10) Patent No.: US 9,788,359 B2
(45) Date of Patent: Oct. 10, 2017

(54) USER EQUIPMENT, BASE STATION, AND DATA TRANSMISSION METHODS THEREOF

(71) Applicant: Institute For Information Industry, Taipei (TW)

(72) Inventors: Chiu-Wen Chen, Taipei (TW); Shiann-Tsong Sheu, Taipei (TW)

(73) Assignee: Institute For Information Industry, Taipei (TW)

( * ) Notice: Subject to any disclaimer, the term of this patent is extended or adjusted under 35 U.S.C. 154(b) by 116 days.

(21) Appl. No.: 14/964,054

(22) Filed: Dec. 9, 2015

(65) Prior Publication Data

US 2016/0191228 A1 Jun. 30, 2016

Related U.S. Application Data

(60) Provisional application No. 62/097,597, filed on Dec. 30, 2014.

(51) Int. Cl.
| | |
|---|---|
| *H04L 5/14* | (2006.01) |
| *H04W 76/04* | (2009.01) |
| *H04W 88/08* | (2009.01) |
| *H04W 88/02* | (2009.01) |
| *H04W 36/18* | (2009.01) |
| *H04W 28/06* | (2009.01) |
| *H04W 72/04* | (2009.01) |

(52) U.S. Cl.
CPC ........... *H04W 76/046* (2013.01); *H04L 5/143* (2013.01); *H04W 28/06* (2013.01); *H04W 36/18* (2013.01); *H04W 72/04* (2013.01); *H04W 88/02* (2013.01); *H04W 88/08* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,587,444 | B1 * | 7/2003 | Lenzo | H04B 7/2615 370/276 |
| 2011/0261712 | A1 * | 10/2011 | Park | H04W 36/0072 370/252 |

\* cited by examiner

*Primary Examiner* — Kouroush Mohebbi
(74) *Attorney, Agent, or Firm* — Skaar Ulbrich Macari, P.A.

(57) ABSTRACT

A user equipment, a base station, and data transmission methods thereof are provided. The user equipment is connected to a first base station and receives a first FDR configuration of the first base station and a second FDR configuration of the second base station. The user equipment establishes an RRC connection with the second base station. The user equipment performs data transmission with the first base station and establishes a data connection with the second base station on the same frequency band simultaneously according to the first and second FDR configurations. The user equipment performs data transmission with the first base station and performs data transmission with the second base station on the same frequency band simultaneously according to the first and second FDR configurations.

20 Claims, 18 Drawing Sheets

USER EQUIPMENT, BASE STATION, AND DATA TRANSMISSION METHODS THEREOF

This application claims priority to U.S. Provisional Application No. 62/097,597 filed on Dec. 30, 2014, which is hereby incorporated by reference in its entirety.

CROSS-REFERENCES TO RELATED APPLICATIONS

Not applicable.

BACKGROUND OF THE INVENTION

Field of the Invention

The present invention relates to a user equipment (UE), a base station (BS) and data transmission methods thereof; in particular, the present invention relates to a user equipment, a base station and data transmission methods thereof that adopt the Full Duplex Radio (FDR) mechanism.

Descriptions of the Related Art

Many wireless communication standards (e.g., the Long Term Evolution (LTE) standard) currently available in the market support communication and data transmission of mobile devices in a moving status. According to these wireless communication standards, when a mobile device experiences an attenuated signal strength as it gradually moves away from the serving base station, the mobile device is handed over to another base station that can serve the mobile device (called a "target base station" hereinbelow) to maintain the quality of communication and data transmission thereof. Conventional handover technologies may be classified into hard handover technologies and soft handover technologies. The operation modes and shortcomings of these two kinds of handover technologies will be described briefly.

According to hard handover technology, a mobile device firstly detaches from the serving base station and then connects to a target base station of service. Specifically, if the serving base station determines that the mobile device can be handed over to the target base station, the serving base station transmits data for the mobile device in the buffer thereof to the target base station via a backhaul network. Because the data in the buffer of the serving base station is forwarded via the backhaul network, there is a long latency. The target base station that receives the data forwarded by the serving base station via the backhaul network will allocate a wireless resource in advance for use by the mobile device in subsequent connection. However, in the case that the mobile device fails to connect with the target base station subsequently, the wireless resource allocated in advance cannot be used by other mobile devices and this leads to a waste in wireless resource. If the mobile device is successfully handed over to the target base station, the mobile device detaches from the serving base station. The serving base station will not release information of the mobile device until a notice transmitted by the target base station via the backhaul network is received. However, most of the time, the target base station will not notify the serving base station to release the information of the mobile device until the target base station has transmitted all data forwarded by the serving base station to the mobile device and has decoded an end mark; this also leads to a waste in resources.

According to soft handover technology, a mobile device firstly establishes a control connection with a target base station, then interrupts a data connection with the serving base station, and finally hands over the mobile device to the target base station. Specifically, if the serving base station determines that the mobile device can handover to the target base station, the serving base station also transmits data in its buffer that is to be transmitted to the mobile device to the target base station via a backhaul network. Since the data in the buffer of the serving base station is forwarded via the backhaul network, there is a long latency. According to the soft handover technology, the mobile device will not detach from the serving base station until it has established the control connection with the target base station, so the waste caused by allocating wireless resource in advance of the hard handover technology is avoided. Similarly, if the mobile device successfully handovers to the target base station, the serving base station will not release information of the mobile device until a notice transmitted by the target base station via the backhaul network is received. However, usually the target base station will not notify the serving base station to release the information of the mobile device until the target base station has transmitted all data forwarded by the serving base station to the mobile device and has decoded an end mark; this leads to a waste in resources.

Accordingly, an urgent need exists in the art to provide a data transmission technology that is used in a handover procedure and that overcomes the aforesaid shortcomings.

SUMMARY OF THE INVENTION

An objective of the present invention is to provide a user equipment. The user equipment comprises a transceiver and a storage electrically connected to each other. The transceiver connects to a first base station and is configured to receive a first Full Duplex Radio (FDR) configuration of the first base station and a second FDR configuration of a second base station. The storage is stored with the first FDR configuration and the second FDR configuration. The transceiver further establishes a Radio Resource Control (RRC) connection with the second base station. The transceiver further performs data transmission with the first base station and establishes a data connection with the second base station on a same frequency band simultaneously according to the first FDR configuration and the second FDR configuration. The transceiver further performs data transmission with the first base station and performs data transmission with the second base station on the same frequency band simultaneously according to the first FDR configuration and the second FDR configuration. Specifically, when the transceiver performs uplink transmission with the first base station according to the first FDR configuration and the second FDR configuration, the transceiver performs downlink transmission with the second base station simultaneously. When the transceiver performs downlink transmission with the first base station according to the first FDR configuration and the second FDR configuration, the transceiver performs uplink transmission with the second base station simultaneously.

Another objective of the present invention is to provide a base station. The base station comprises a transceiver and a storage electrically connected to each other. The storage is stored with a first FDR configuration. The transceiver connects to a first user equipment and a second user equipment. The transceiver is configured to transmit the first FDR configuration to the first user equipment and receive data from the second user equipment on a same frequency band simultaneously according to the first FDR configuration. The transceiver initiates the first user equipment to establish an RRC connection with a target base station and receive data from the second user equipment on the same frequency band simultaneously according to the first FDR configuration. The transceiver initiates the first user equipment to establish a data connection with the target base station and receives data from the second user equipment on the same frequency band simultaneously according to the first FDR configuration. Specifically, when the transceiver performs uplink transmission with the first user equipment according to the first FDR configuration and the second FDR configuration, the transceiver performs downlink transmission with the second user equipment simultaneously. When the transceiver performs downlink transmission with the first user equipment according to the first FDR configuration and the second FDR configuration, the transceiver performs the uplink transmission with the second user equipment simultaneously.

A further objective of the present invention is to provide a data transmission method for user equipment. The user equipment connects to a first base station. The data transmission method comprises the following steps: (a) receiving a first FDR configuration of the first base station and a second FDR configuration of a second base station by the user equipment, (b) establishing an RRC connection with the second base station by the user equipment, (c) performing data transmission with the first base station and establishing a data connection with the second base station on a same frequency band simultaneously by the user equipment according to the first FDR configuration and the second FDR configuration, and (d) performing data transmission with the first base station and performing data transmission with the second base station on the same frequency band simultaneously by the user equipment according to the first FDR configuration and the second FDR configuration. Specifically, when the user equipment performs uplink transmission with the first base station according to the first FDR configuration and the second FDR configuration, the user equipment performs downlink transmission with the second base station simultaneously. When the user equipment performs downlink transmission with the first base station according to the first FDR configuration and the second FDR configuration, the user equipment performs uplink transmission with the second base station simultaneously.

Yet a further objective of the present invention is to provide a data transmission method for a base station. The base station has a first FDR configuration and connects to a first user equipment and a second user equipment. The data transmission method comprises the following steps: (a) transmitting the first FDR configuration to the first user equipment and receiving data from the second user equipment on a same frequency band simultaneously by the base station according to the first FDR configuration, (b) initiating the first user equipment to establish an RRC connection with a target base station and receiving data from the second user equipment on the same frequency band simultaneously by the base station according to the first FDR configuration, and (c) initiating the first user equipment to establish a data connection with the target base station and receiving data from the second user equipment on the same frequency band simultaneously by the base station according to the first FDR configuration. Specifically, when the base station performs uplink transmission with the first user equipment according to the first FDR configuration and the second FDR configuration, the base station performs downlink transmission with the second user equipment simultaneously. When the base station performs downlink transmission with the first user equipment according to the first FDR configuration and the second FDR configuration, the base station performs the uplink transmission with the second user equipment simultaneously.

According to the technology disclosed in the present invention, if a user equipment, a first base station (i.e. the base station that is currently serving the user equipment), and a target base station that the user equipment is to be handed over to (i.e., a second base station) all supports the FDR mode, the user equipment can perform data transmission with the first base station on a same frequency band simultaneously during the process of establishing an RRC connection and a data connection. Additionally, after the user equipment has established the data connection with the second base station, the user equipment can still perform data transmission with the first base station and perform data transmission with the second base station on the same frequency band simultaneously. After all the data to be transmitted to the user equipment in the first base station has been transmitted to the user equipment, the user equipment is served by only the second base station. It shall be emphasized that when the user equipment performs uplink transmission with the first base station according to the first FDR configuration and the second FDR configuration, the user equipment also performs downlink transmission with the second base station simultaneously. When the user equipment performs downlink transmission with the first base station according to the first FDR configuration and the second FDR configuration, the user equipment also performs uplink transmission with the second base station simultaneously. By adopting the FDR mode, the present invention can reduce or completely eliminate the delay caused by forwarding data via the backhaul network. In addition, the resource waste that caused by allocating a wireless resource to the user equipment in advance and the resource waste caused by releasing information of the user equipment from the base station too late can be reduced or even be eliminated.

From the perspective of the first base station, in the process of transmitting the first FDR configuration to the user equipment and in the process of initiating the user equipment to establish an RRC connection and a data connection with the second base station, the first base station can perform data transmission with other user equipments on the same frequency band simultaneously. Additionally, after the data connection with the second base station has been established, the first base station can still perform data transmission with the user equipment continuously until all data to be transmitted to the user equipment in the first base station has been transmitted. It shall be appreciated that when the first base station performs uplink transmission with a user equipment according to the first FDR configuration and the second FDR configuration, the first base station also performs downlink transmission with other user equipments simultaneously. When the first base station performs downlink transmission with a user equipment according to the first FDR configuration and the second FDR configuration, the first base station also performs uplink transmission with other user equipments simultaneously. By adopting the FDR mode, the present invention can reduce or completely eliminate the delay caused by forwarding data via the backhaul network. In addition, the resource waste that caused by allocating a wireless resource to the user equipment in advance and the resource waste caused by releasing information of the user equipment from the base station too late can be reduced or even be eliminated The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, the user equipment, the base station and data transmission methods thereof according to the present invention will be explained with reference to embodiments thereof. However, these embodiments are not intended to limit the present invention to any specific environment, applications, or particular implementations described in these embodiments. Therefore, description of these embodiments is only for purpose of illustration rather than to limit the present invention. It should be appreciated that in the following embodiments and the attached drawings, elements unrelated to the present invention are omitted from depiction.

Figure 1A:
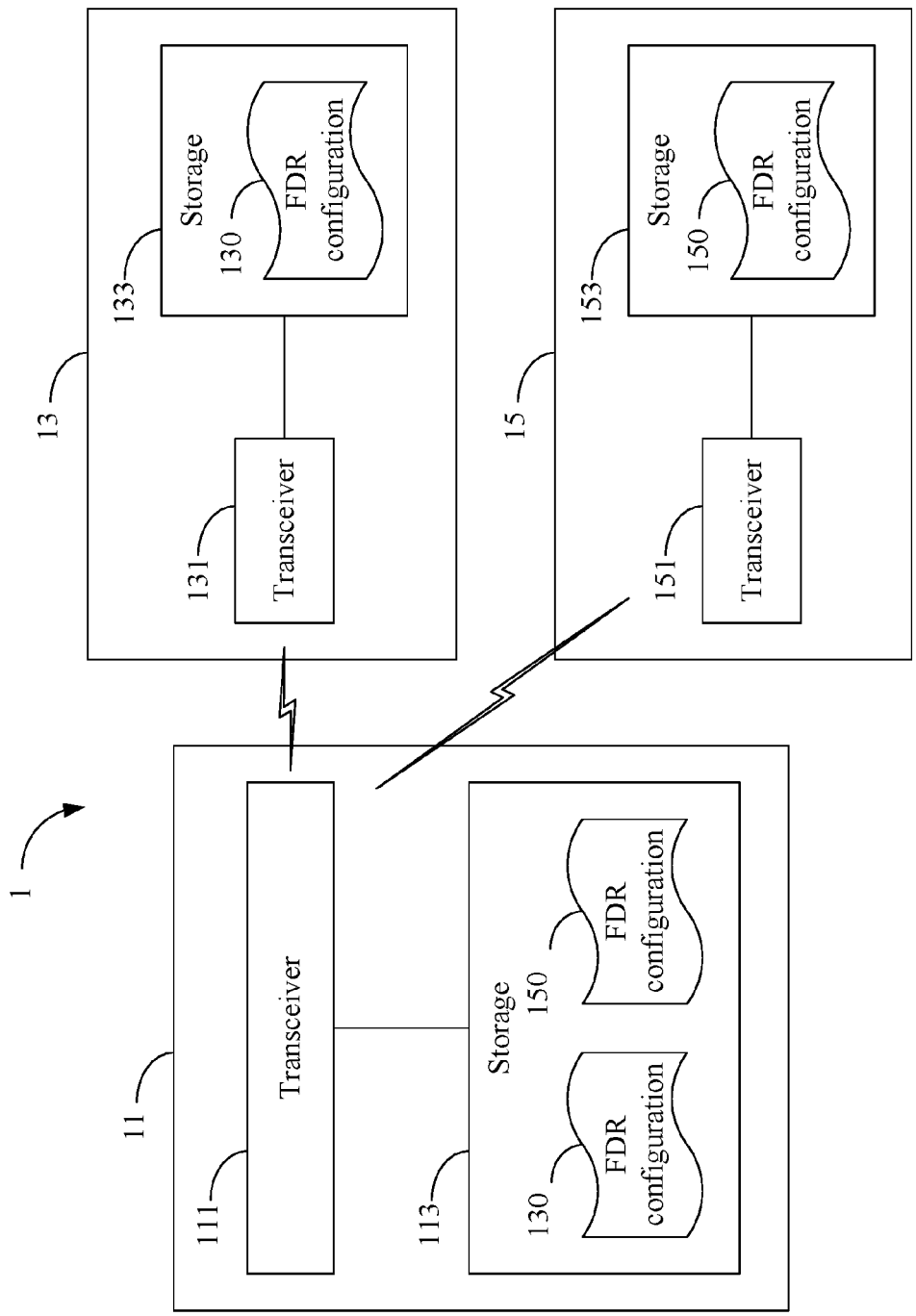
FIG. 1A is a schematic view depicting a part of architecture according to the first to fourth embodiment of the present invention.
Figure 1B:
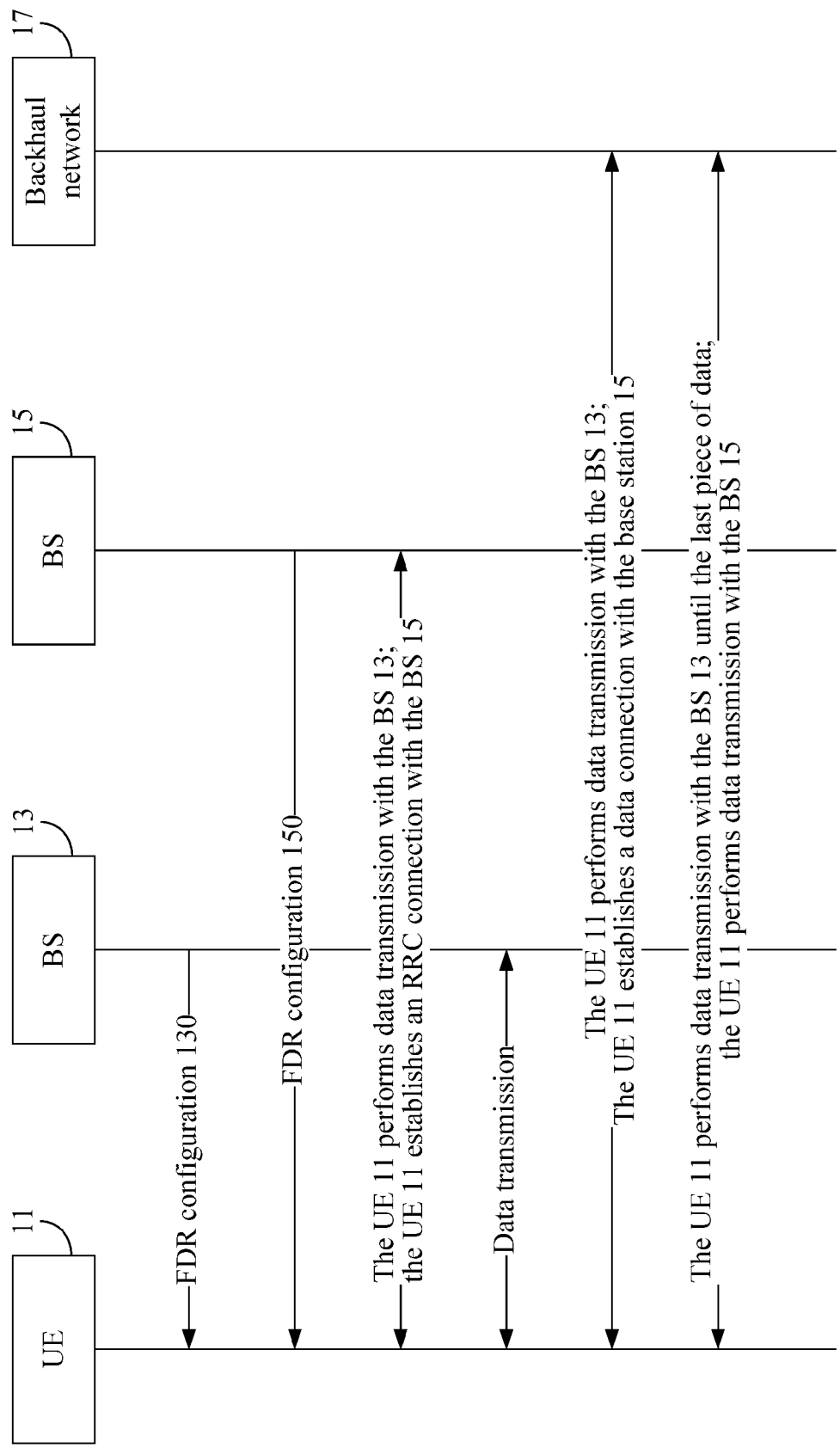
FIG. 1B is a schematic view depicting a part of signal transmissions according to the first embodiment of the present invention.

The first embodiment of the present invention is a wireless network system 1. A schematic view of a part of the architecture of the wireless network system 1 is depicted in FIG. 1A and a schematic view of a part of signal transmissions of the wireless network system 1 is depicted in FIG. 1B. The wireless network system 1 comprises a user equipment 11, two base stations 13, 15, and a backhaul network 17. It shall be appreciated that if the wireless network system 1 conforms to the Long Term Evolution (LTE) standard, the backhaul network 17 may comprise a Mobility Management Entity (MME), a Serving Gateway (S-GW), and a Packet Data Network Gateway (PDN-GW or P-GW). It shall be appreciated that the present invention has no limitation on the number of base stations that can be included in a wireless network system and the number of user equipments that can be served by a base station. Furthermore, as can be appreciated by those of ordinary skill in the art, the user equipment may be any mobile device that can communicate with a base station.

The user equipment 11 comprises a transceiver 111 and a storage 113 electrically connected with each other. The transceiver 111 may be an interface that can communicatively connect with a base station. The storage 113 may be a memory, a Universal Serial Bus (USB) disk, a hard disk, a compact disk (CD), a mobile disk, or any other storage medium or circuit known to those of ordinary skill in the art and having the same functionality. The base station 13 comprises a transceiver 131 and a storage 133 electrically connected with each other. The base station 15 comprises a transceiver 151 and a storage 153 electrically connected with each other. The transceivers 131, 151 may each be any interface capable of communicatively connecting to a user equipment. The storages 133, 153 may each be a memory, a hard disk, or any other storage medium or circuit known to those of ordinary skill in the art and having the same functionality.

In this embodiment, the user equipment 11 and the base stations 13, 15 all support the FDR mode. As will be understood by those of ordinary skill in the art, a device/equipment/station supporting the FDR mode means that the device/equipment/station is able to perform uplink transmission and downlink transmission on the same frequency band simultaneously. The storage 133 of the base station 13 stores an FDR configuration 130, while the storage 153 of the base station 15 stores an FDR configuration 150. It shall be appreciated that the FDR configuration 130 may comprise physical control parameters of the FDR mode provided by the base station 13, e.g., the frame structure, at which time point(s) (or time interval(s)) and on which frequency band the base station 13 supports the FDR mode, the modulation mode, the coding mode, and etc. Similarly, the FDR configuration 150 may comprise physical control parameters of the FDR mode provided by the base station 15, e.g., the frame structure, at which time point(s) (or time interval(s)) and on which frequency band the base station 15 supports the FDR mode, the modulation mode, the coding mode and etc. In some embodiments, the FDR configurations 130, 150 may each be an FDR configuration specific to a certain user equipment (e.g., the user equipment 11).

In this embodiment, the user equipment 11 is located within the coverage of the base station 13 and also within the coverage of the base station 15. The user equipment 11 connects to the base station 13 (i.e., the user equipment 11 is served by the base station 13). The transceiver 131 of the base station 13 transmits the FDR configuration 130 to the user equipment 11. As an example, the transceiver 131 may transmit the FDR configuration 130 to the user equipment 11 during attachment of the user equipment 11 to the base station 13. As another example, the transceiver 131 may also periodically transmit the FDR configuration 130 to the user equipment 11. The FDR configuration 130 is then received by the transceiver 111 of the user equipment 11 from the base station 13 and stored in the storage 113. Additionally, the transceiver 151 of the base station 15 transmits the FDR configuration 150 periodically. For example, the transceiver 151 may broadcast the FDR configuration 150 periodically. Because the user equipment 11 is located within the coverage of the base station 15, the FDR configuration 150 is received by the transceiver 111 of the user equipment 11 from the base station 15 and stored in the storage 113. It shall be appreciated that if a base station transmits the FDR configuration through broadcasting, the one-way handshake mechanism is adopted in the transmission process. On the other hand, if a base station transmits the FDR configuration to a specific user equipment, then the one-way handshake mechanism or the two-way handshake mechanism is adopted in the transmission process.

Because the user equipment 11 connects to the base station 13, communication quality between the user equipment 11 and the base station 13 is measured periodically or aperiodically by the transceiver 111 of the user equipment 11 and/or the transceiver 131 of the base station 13. For example, the communication quality may be a Reference Signal Received Power (RSRP), a Reference Signal Received Quality (RSRQ), a Signal to Interference plus Noise Ratio (SINR), a Signal to Noise Ratio (SNR), and/or other information that can be used to evaluate the FDR communication quality (e.g., FDR-based SINR).

The transceiver 111 of the user equipment 11 establishes a Radio Resource Control (RRC) connection with the base station 15 when the user equipment 11 and/or the base station 13 determines (e.g., the processor of the user equipment 11 and/or the processor of the base station 13 determines) that a first communication quality level is reached between the user equipment 11 and the base station 13 (e.g., the communication quality measured is lower than a first threshold). It shall be appreciated that in this embodiment, the transceiver 111 performs data transmission with the base station 13 and establishes the RRC connection with the base station 15 on a same frequency band simultaneously according to the FDR configurations 130, 150. During the process that the transceiver 111 simultaneously performs data transmission with the base station 13 and establishes the RRC connection with the base station 15 on the same frequency band, the transceiver 111 acts according to two rules. First, the transceiver 111 performs downlink transmission with the base station 15 (i.e., transmission from the base station 15 to the transceiver 111) when the transceiver 111 performs uplink transmission with the base station 13 (i.e., transmission from the transceiver 111 to the base station 13). Second, the transceiver 111 performs uplink transmission with the base station 15 when the transceiver 111 performs downlink transmission with the base station 13. It shall be appreciated that the transceiver 111 still performs data transmission with the base station 13 continuously after the RRC connection with the base station 15 has been established by the transceiver 111 of the user equipment 11.

Because the user equipment 11 still connects to the base station 13, the transceiver 111 of the user equipment 11 and/or the transceiver 131 of the base station 13 still measures the communication quality between the user equipment 11 and the base station 13 periodically or aperiodically. When the user equipment 11 and/or the base station 13 determines (e.g., the processor of the user equipment 11 and/or the processor of the base station 13 determines) that a second communication quality level is reached between the user equipment 11 and the base station 13 (e.g., the communication quality measured is lower than a second threshold), this means that the communication quality therebetween further degrades. Accordingly, the transceiver 111 of the user equipment 11 performs data transmission with the base station 13 and establishes a data connection with the base station 15 on the same frequency band simultaneously according to the FDR configurations 130, 150. During the process that the transceiver 111 performs data transmission with the base station 13 and establishes the data connection with the base station 15 on the same frequency band simultaneously, the transceiver 111 acts according to the two rules. First, the transceiver 111 performs downlink transmission with the base station 15 when the transceiver 111 performs uplink transmission with the base station 13. Second, the transceiver 111 performs uplink transmission with the base station 15 when the transceiver 111 performs downlink transmission with the base station 13.

It shall be appreciated that in some embodiments of the present invention, the transceiver 111 may directly perform data transmission with the base station 13 and establishes RRC connection with the base station 15 on the same frequency band simultaneously according to the FDR configurations 130, 150 without determining whether a first communication quality level is reached between the user equipment 11 and the base station 13. Similarly, in some embodiments of the present invention, the transceiver 111 may directly perform data transmission with the base station 13 and establishes data connection with the base station 15 on the same frequency band simultaneously according to the FDR configurations 130, 150 without determining whether a second communication quality level is reached between the user equipment 11 and the base station 13.

After the user equipment 11 has established the data connection with the base station 15, the transceiver 111 still performs data transmission with the base station 13 continuously until all data to be transmitted to the user equipment 11 in the base station 13 has been transmitted to the user equipment 11. It shall be appreciated that in this process, the transceiver 111 performs data transmission with the base station 13 and performs data transmission with the base station 15 on the same frequency band simultaneously according to the FDR configurations 130, 150. Similarly, during the process of performing data transmission with the base station 13 and performing data transmission with the base station 15 on the same frequency band simultaneously by the transceiver 111, the transceiver 111 acts according to two rules. First, the transceiver 111 performs downlink transmission with the base station 15 when the transceiver 111 performs uplink transmission with the base station 13. Second, the transceiver 111 performs uplink transmission with the base station 15 when the transceiver 111 performs downlink transmission with the base station 13. The user equipment 11 is served by only the base station 15 after all data to be transmitted to the user equipment 11 in the base station 13 has been transmitted to the user equipment 11.

As can be known from the above descriptions, since the user equipment 11 and the base stations 13, 15 all support the FDR mode, the user equipment 11 may perform data transmission with the base station 13 on the same frequency band simultaneously during the processes that the user equipment 11 is establishing the RRC connection and data connection with the base station 15. Additionally, after the data connection with the base station 15 has been established by the user equipment 11, the user equipment 11 performs data transmission with the base station 13 and performs data transmission with the base station 15 on the same frequency band simultaneously. The user equipment 11 is served by only the base station 15 after all data to be transmitted to the user equipment 11 in the base station 13 has been transmitted to the user equipment 11. By adopting the FDR mode, the technology disclosed in the first embodiment can reduce or completely eliminate the delay caused by forwarding data via the backhaul network. The resource waste that might be caused by allocating a wireless resource to the user equipment in advance and the resource waste caused by releasing information of the user equipment from the base station too late can be reduced or even be eliminated.

Figure 2:
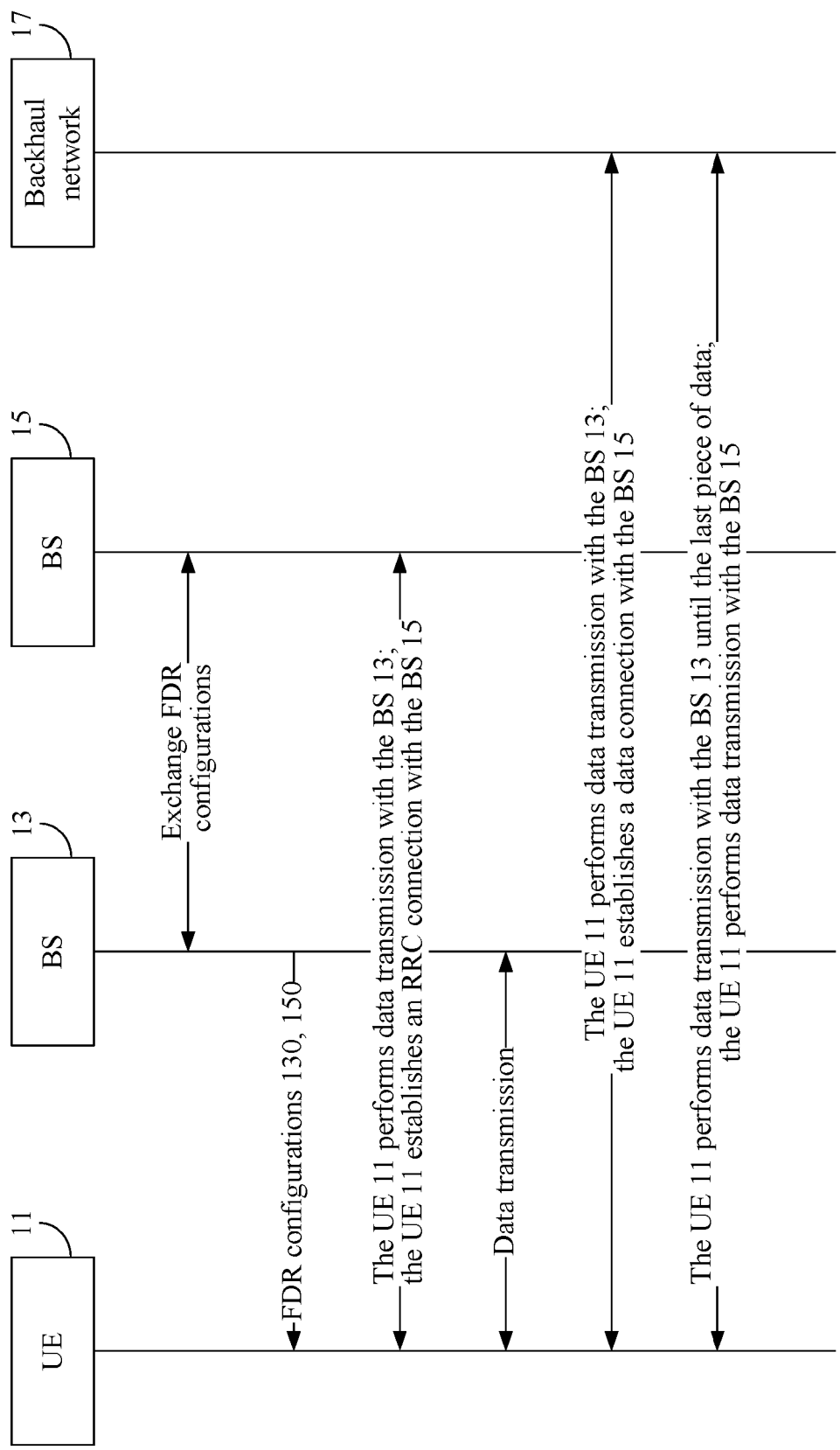
FIG. 2 is a schematic view depicting a part of signal transmissions according to the second embodiment of the present invention.

Please refer to FIG. 1A and FIG. 2 for the second embodiment of the present invention. FIG. 2 is a schematic view depicting a part of signal transmissions according to the second embodiment. Most operations of the second embodiment are similar to those of the first embodiment, so only the differences therebetween will be detailed hereinbelow.

In this embodiment, the user equipment 11 and the base stations 13, 15 all support the FDR mode. The base station 13 and the base station 15 exchange each other's FDR configurations via the backhaul network 17. In other words, the base station 13 transmits the FDR configuration 130 to the base station 15 via the backhaul network 17, while the base station 15 transmits the FDR configuration 150 to the base station 13 via the backhaul network 17. In this embodiment, the user equipment 11 is located within the coverage of the base station 13 and also within the coverage of the base station 15. The user equipment 11 connects to the base station 13 (i.e., the user equipment 11 is served by the base station 13). The transceiver 131 of the base station 13 transmits the FDR configurations 130, 150 to the user equipment 11. The FDR configurations 130, 150 are received by the transceiver 111 of the user equipment 11 from the base station 13 and stored in the storage 113.

Subsequent operations of the second embodiment are the same as those of the first embodiment. Briefly speaking, the transceiver 111 of the user equipment 11 and/or the transceiver 131 of the base station 13 measures communication quality between the user equipment 11 and the base station 13 periodically or aperiodically. When a first communication quality level is reached between the user equipment 11 and the base station 13 (e.g., the communication quality measured has become lower than a first threshold), the transceiver 111 of the user equipment 11 performs data transmission with the base station 13 and establishes the RRC connection with the base station 15 on the same frequency band simultaneously according to the FDR configurations 130, 150. The transceiver 111 still performs data transmission with the base station 13 continuously after the RRC connection with the base station 15 has been established by the transceiver 111 of the user equipment 11. When a second communication quality level is reached between the user equipment 11 and the base station 13 (e.g., the communication quality measured is lower than a second threshold), this means that the communication quality therebetween further degrades. Accordingly, the transceiver 111 of the user equipment 11 performs data transmission with the base station 13 and establishes a data connection with the base station 15 on a same frequency band simultaneously according to the FDR configurations 130, 150.

It shall be appreciated that in some embodiments of the present invention, the transceiver 111 may directly perform data transmission with the base station 13 and establish the RRC connection with the base station 15 on the same frequency band simultaneously according to the FDR configurations 130, 150 without determining whether a first communication quality level is reached between the user equipment 11 and the base station 13. Similarly, in some embodiments of the present invention, the transceiver 111 can directly perform data transmission with the base station 13 and establishes the data connection with the base station 15 on the same frequency band simultaneously according to the FDR configurations 130, 150 without determining whether a second communication quality level is reached between the user equipment 11 and the base station 13.

After the data connection with the base station 15 has been established by the user equipment 11, the transceiver 111 still performs data transmission with the base station 13 continuously until all data to be transmitted to the user equipment 11 in the base station 13 has been transmitted to the user equipment 11. It shall be appreciated that in this process, the transceiver 111 performs data transmission with the base station 13 and performs data transmission with the base station 15 on the same frequency band simultaneously according to the FDR configurations 130, 150. The user equipment 11 is served by only the base station 15 after all data to be transmitted to the user equipment 11 in the base station 13 has been transmitted to the user equipment 11.

According to the above descriptions, because the user equipment 11 and the base stations 13, 15 all support the FDR mode, the user equipment 11 may perform data transmission with the base station 13 on the same frequency band simultaneously during the processes that the user equipment 11 establishes the RRC connection and the data connection with the base station 15. Additionally, after the data connection with the base station 15 has been established by the user equipment 11, the user equipment 11 performs data transmission with the base station 13 and performs data transmission with the base station 15 on the same frequency band simultaneously. The user equipment 11 is served by only the base station 15 after all the data to be transmitted to the user equipment 11 in the base station 13 has been transmitted to the user equipment 11. By adopting the FDR mode, the technology disclosed in the second embodiment can reduce or completely eliminate the delay caused by forwarding data via the backhaul network. The resource waste that might be caused by allocating a wireless resource to the user equipment in advance and the resource waste caused by releasing information of the user equipment from the base station too late can be reduced or even be eliminated.

Figure 3:
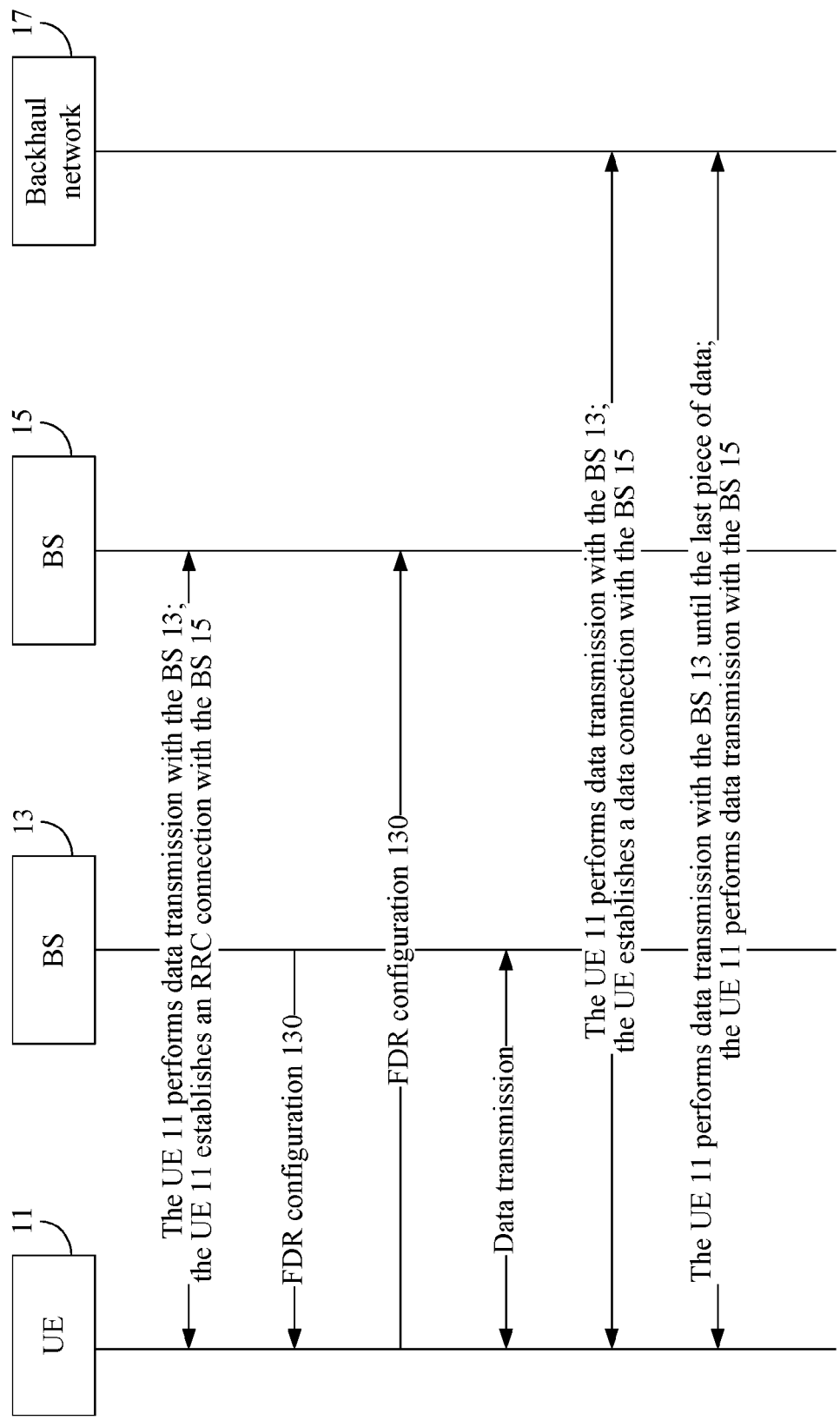
FIG. 3 is a schematic view depicting a part of signal transmissions according to the third embodiment of the present invention.

Please refer to FIG. 1A and FIG. 3 for a third embodiment of the present invention. FIG. 3 is a schematic view depicting a part of signal transmissions according to the third embodiment. Most operations of the third embodiment are similar to those of the first embodiment, so only differences therebetween will be detailed hereinbelow.

In this embodiment, the user equipment 11 is located within the coverage of the base station 13 and also within the coverage of the base station 15. The user equipment 11 connects to the base station 13 (i.e., the user equipment 11 is served by the base station 13). The transceiver 111 of the user equipment 11 and/or the transceiver 131 of the base station 13 measures the communication quality between the user equipment 11 and the base station 13 periodically or aperiodically. When a first communication quality level is reached between the user equipment 11 and the base station 13 (e.g., the communication quality measured has become lower than a first threshold), the transceiver 111 of the user equipment 11 performs data transmission with the base station 13 and establishes an RRC connection with the base station 15 simultaneously. It shall be appreciated that in some embodiments of the present invention, the transceiver 111 may directly establish the RRC connection with the base station 15 without determining whether a first communication quality level is reached between the user equipment 11 and the base station 13.

In this embodiment, the user equipment 11 and the base stations 13, 15 all support the FDR configuration. In the process of establishing the RRC connection with the base station 15 by the user equipment 11, the transceiver 151 of the base station 15 may transmit the FDR configuration 150 to the user equipment 11 together. The FDR configuration 150 is received by the transceiver 111 of the user equipment 11. Additionally, because the user equipment 11 connects to the base station 13, the transceiver 131 of the base station 13 transmits the FDR configuration 130 to the user equipment 11. As an example, the transceiver 131 may transmit the FDR configuration 130 to the user equipment 11 during attachment of the user equipment 11 to the base station 13. As another example, the transceiver 131 may also transmit the FDR configuration 130 to the user equipment 11 periodically. The FDR configuration 130 is received by the transceiver 111 of the user equipment 11 from the base station 13 and stored in the storage 113. Then, the transceiver 111 of the user equipment 11 transmits the FDR configuration 130 to the base station 15 so that the base station 15 can learn the FDR configuration 130 of the base station 13.

Subsequent operations of the third embodiment are similar to those of the first embodiment. Briefly speaking, the transceiver 111 still performs data transmission with the base station 13 continuously after the RRC connection with the base station 15 has been established by the transceiver 111 of the user equipment 11. Additionally, the transceiver 111 of the user equipment 11 and/or the transceiver 131 of the base station 13 measures the communication quality between the user equipment 11 and the base station 13 periodically or aperiodically. When a second communication quality level is reached between the user equipment 11 and the base station 13 (e.g., the communication quality measured is lower than a second threshold), this means that the communication quality therebetween further degrades. Accordingly, the transceiver 111 of the user equipment 11 performs data transmission with the base station 13 and establishes a data connection with the base station 15 on the same frequency band simultaneously according to the FDR configurations 130, 150. It shall be appreciated that in some embodiments of the present invention, the transceiver 111 may directly perform data transmission with the base station 13 and establishes the data connection with the base station 15 on the same frequency band simultaneously according to the FDR configurations 130, 150 without determining whether the second communication quality level has been reached between the user equipment 11 and the base station 13.

After the data connection with the base station 15 has been established by the user equipment 11, the transceiver 111 still performs data transmission with the base station 13 continuously until all data to be transmitted to the user equipment 11 in the base station 13 has been transmitted to the user equipment 11. It shall be appreciated that in this process, the transceiver 111 performs data transmission with the base station 13 and performs data transmission with the base station 15 on the same frequency band simultaneously according to the FDR configurations 130, 150. The user equipment 11 is served by only the base station 15 after all data to be transmitted to the user equipment 11 in the base station 13 has been transmitted to the user equipment 11.

According to the above descriptions, the technology of the third embodiment allows the user equipment 11 to simultaneously perform data transmission with the base station 13 and establishing the RRC connection with the base station 15. Additionally, since the user equipment 11 and the base stations 13, 15 all support the FDR mode, the user equipment 11 may perform data transmission with the base station 13 on the same frequency band simultaneously during the process that the user equipment 11 establishes the data connection with the base station 15. Furthermore, after the data connection with the base station 15 has been established by the user equipment 11, the user equipment 11 performs data transmission with the base station 13 and performs data transmission with the base station 15 on the same frequency band simultaneously. The user equipment 11 is served by only the base station 15 after all data to be transmitted to the user equipment 11 in the base station 13 has been transmitted to the user equipment 11. By adopting the FDR mode, the technology disclosed in the first embodiment can reduce or completely eliminate the delay caused by forwarding data via the backhaul network. Resource waste that caused by allocating a wireless resource to the user equipment in advance and resource waste caused by releasing information of the user equipment from the base station too late can be reduced or even be eliminated.

Figure 4:
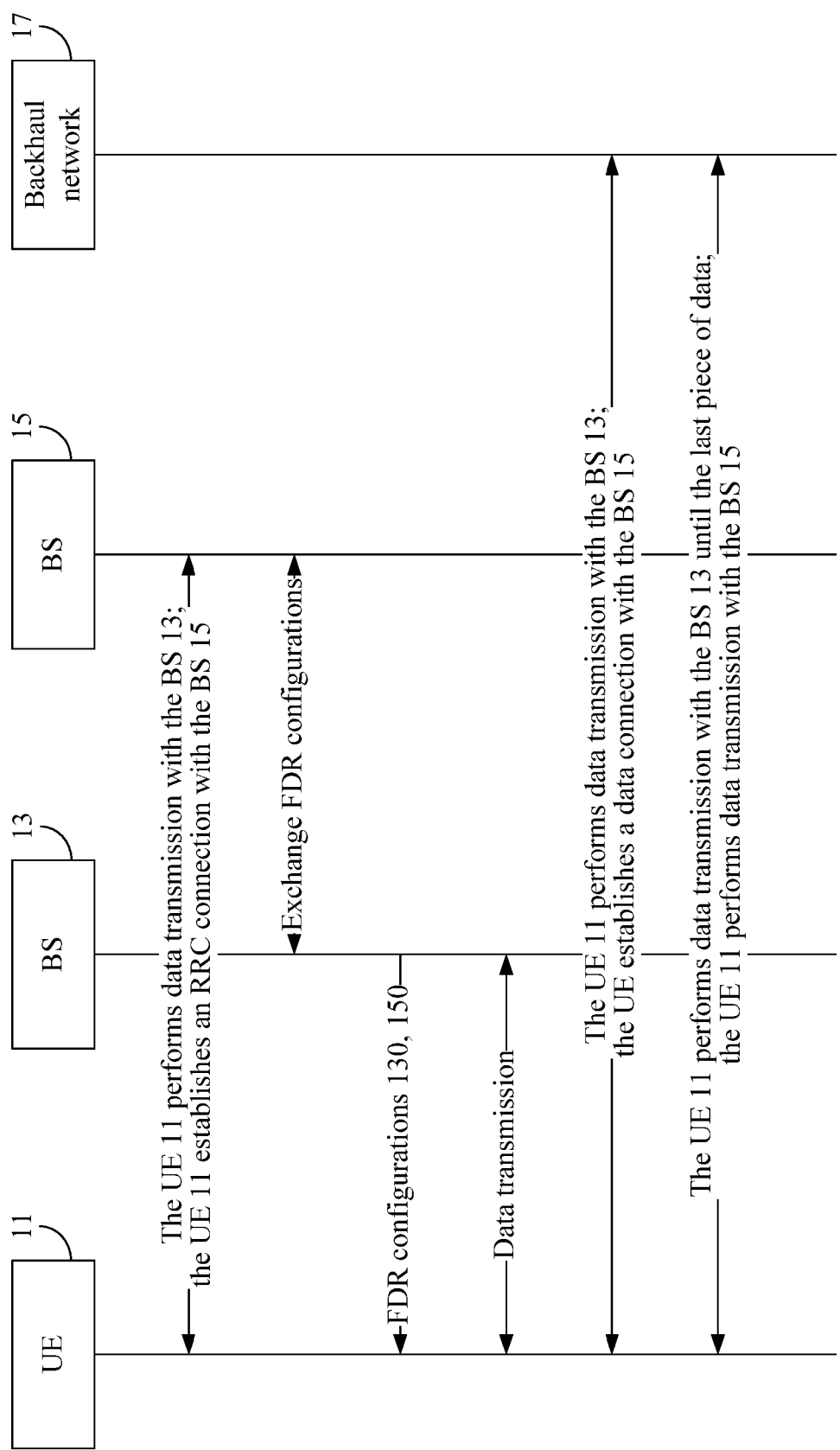
FIG. 4 is a schematic view depicting a part of signal transmissions according to the fourth embodiment of the present invention.

Please refer to FIG. 1A and FIG. 4 for the fourth embodiment of the present invention. FIG. 4 is a schematic view depicting a part of signal transmissions according to the fourth embodiment. Most operations of the fourth embodiment are similar to those of the first embodiment, so only the differences therebetween will be detailed hereinbelow.

In this embodiment, the user equipment 11 is located within the coverage of the base station 13 and also within the coverage of the base station 15. The user equipment 11 connects to the base station 13 (i.e., the user equipment 11 is served by the base station 13). The transceiver 111 of the user equipment 11 and/or the transceiver 131 of the base station 13 measures the communication quality between the user equipment 11 and the base station 13 periodically or aperiodically. When a first communication quality level is reached between the user equipment 11 and the base station 13 (e.g., the communication quality measured is lower than a first threshold), the transceiver 111 of the user equipment 11 performs data transmission with the base station 13 and establishes an RRC connection with the base station 15 simultaneously. It shall be appreciated that in some embodiments of the present invention, the transceiver 111 may directly establish the RRC connection with the base station 15 without determining whether a first communication quality level is reached between the user equipment 11 and base station 13.

In this embodiment, the user equipment 11 and the base stations 13, 15 all support the FDR configuration. The base station 13 and the base station 15 exchange their FDR configurations via the backhaul network 17. In other words, the base station 13 transmits the FDR configuration 130 to the base station 15 via the backhaul network 17. The base station 15 transmits the FDR configuration 150 to the base station 13 via the backhaul network 17. The transceiver 131 of the base station 13 transmits the FDR configurations 130, 150 to the user equipment 11. The FDR configurations 130, 150 are received by the transceiver 111 of the user equipment 11 from the base station 13 and stored in the storage 113.

Subsequent operations of the fourth embodiment are similar to those of the first embodiment. Briefly speaking, the transceiver 111 of the user equipment 11 still performs data transmission with the base station 13 continuously after the RRC connection with the base station 15 has been established by the transceiver 111. Additionally, the transceiver 111 of the user equipment 11 and/or the transceiver 131 of the base station 13 measures the communication quality between the user equipment 11 and the base station 13 periodically or aperiodically. When a second communication quality level is reached between the user equipment 11 and the base station 13 (e.g., the communication quality measured is lower than a second threshold), this means that the communication quality therebetween further degrades. Accordingly, the transceiver 111 of the user equipment 11 performs data transmission with the base station 13 and establishes a data connection with the base station 15 on the same frequency band simultaneously according to the FDR configurations 130, 150. It shall be appreciated that in some embodiments of the present invention, the transceiver 111 may directly perform data transmission with the base station 13 and establishes the data connection with the base station 15 on a same frequency band simultaneously according to the FDR configurations 130, 150 without determining whether a second communication quality level has been reached between the user equipment 11 and the base station 13.

After the data connection with the base station 15 has been established by the user equipment 11, the transceiver 111 still performs data transmission with the base station 13 continuously until all data to be transmitted to the user equipment 11 in the base station 13 has been transmitted to the user equipment 11. It shall be appreciated that in this process, the transceiver 111 performs data transmission with the base station 13 and performs data transmission with the base station 15 on the same frequency band simultaneously according to the FDR configurations 130, 150. The user equipment 11 is served by only the base station 15 after all data to be transmitted to the user equipment 11 in the base station 13 has been transmitted to the user equipment 11.

According to the above descriptions, the technology of the fourth embodiment allows the user equipment 11 to simultaneously perform data transmission with the base station 13 and establishing the RRC connection with the base station 15. Additionally, since the user equipment 11 and the base stations 13, 15 all support the FDR mode, the user equipment 11 may perform data transmission with the base station 13 on the same frequency band simultaneously during the process that the user equipment 11 establishes the data connection with the base station 15. Furthermore, after the data connection with the base station 15 has been established by the user equipment 11, the user equipment 11 performs data transmission with the base station 13 and performs data transmission with the base station 15 on the same frequency band simultaneously. The user equipment 11 is served by only the base station 15 after all data to be transmitted to the user equipment 11 in the base station 13 has been transmitted to the user equipment 11. By adopting the FDR mode, the technology disclosed in the fourth embodiment can reduce or completely eliminate the delay caused by forwarding data via the backhaul network. In addition, resource waste that caused by allocating a wireless resource to the user equipment in advance and resource waste caused by releasing information of the user equipment from the base station too late can be reduced or even be eliminated.

Figure 5A:
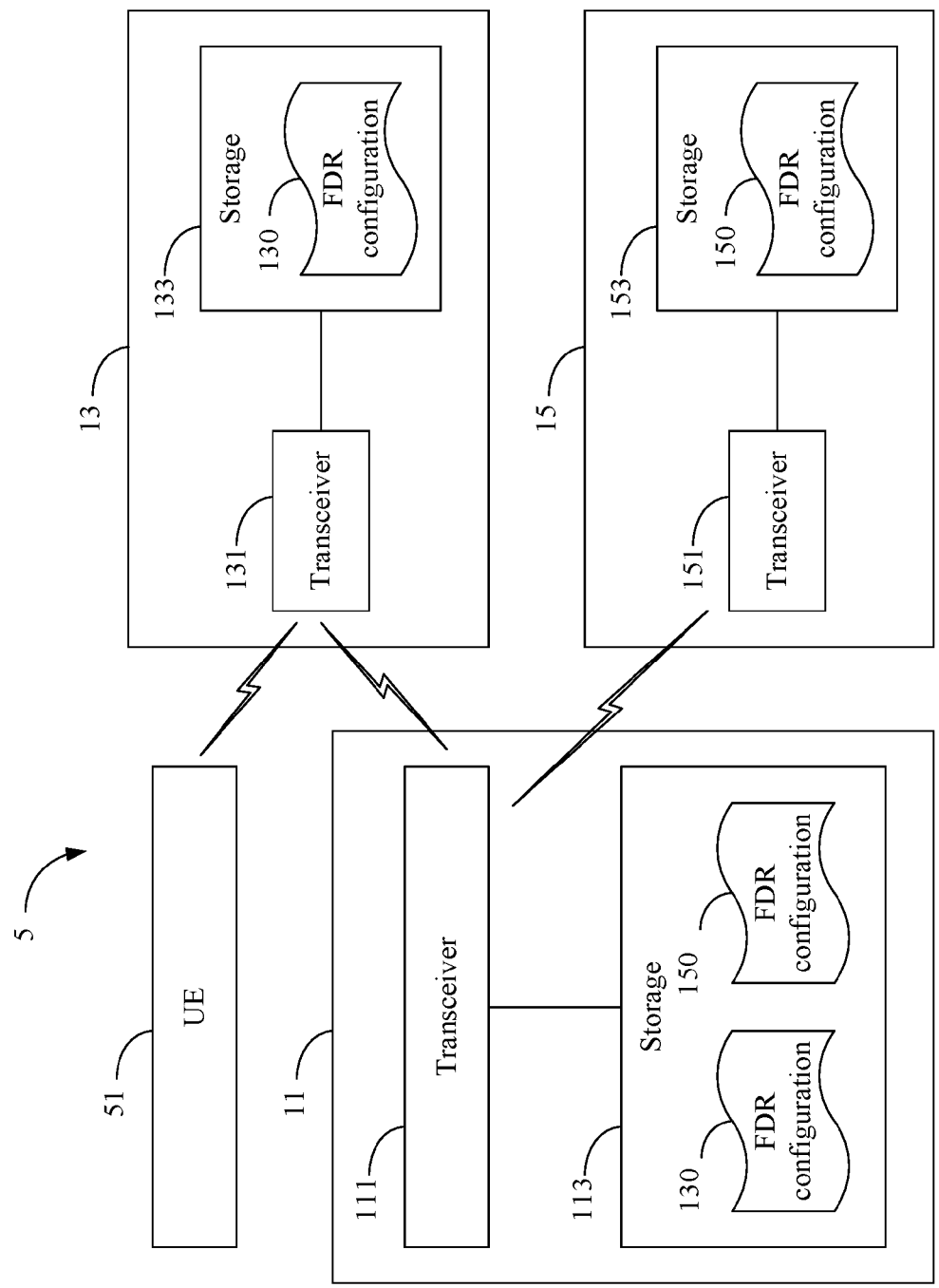
FIG. 5A is a schematic view depicting a part of architecture according to the fifth to eighth embodiment of the present invention.
Figure 5B:
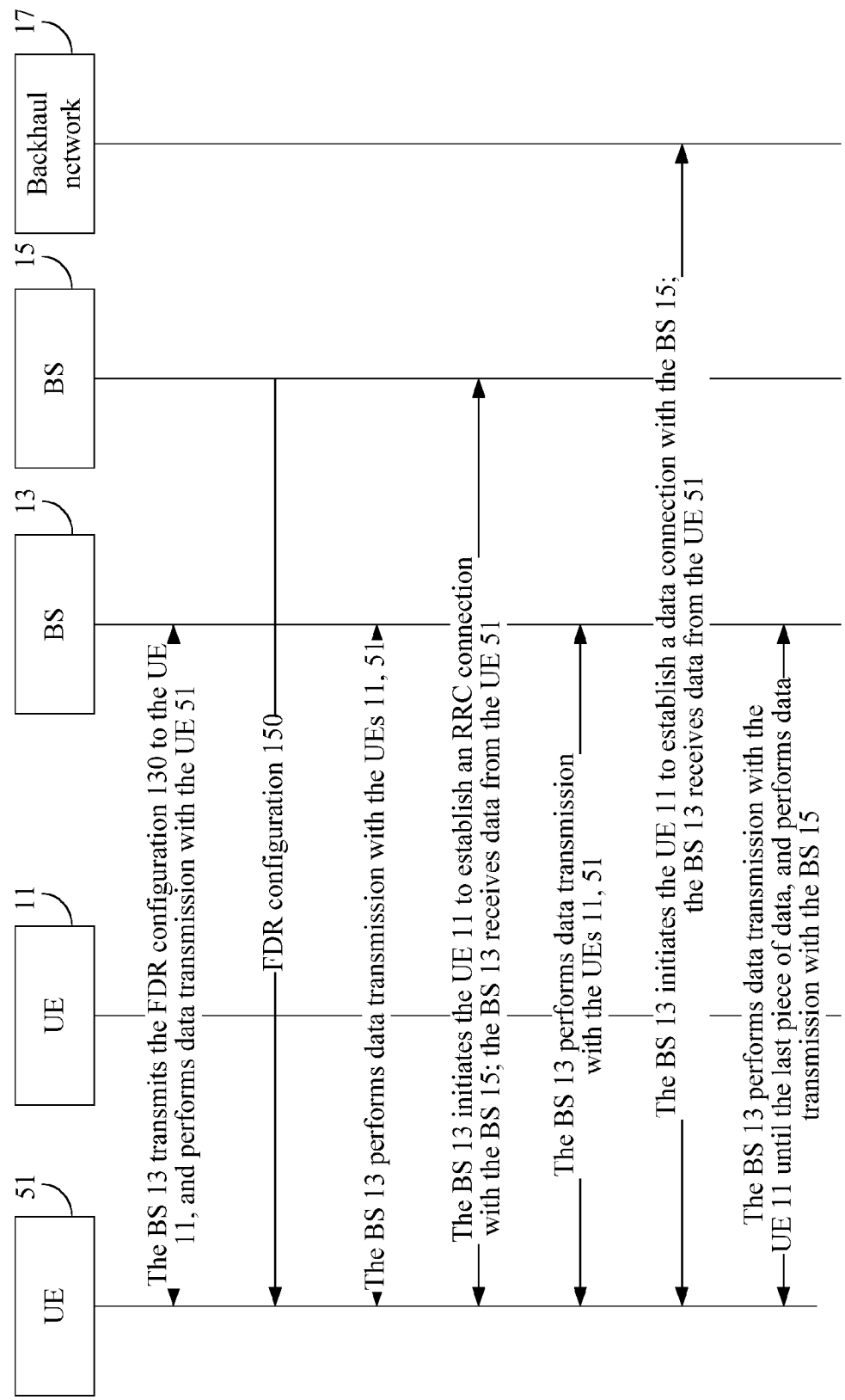
FIG. 5B is a schematic view depicting a part of signal transmissions according to the fifth embodiment of the present invention.

The fifth embodiment of the present invention is a wireless network system 5. A schematic view of a part of architecture of the wireless network system 5 is depicted in FIG. 5A, while a schematic view of a part of signal transmissions of the wireless network system 5 is depicted in FIG. 5B. The wireless network system 5 comprises two user equipments 11, 51, two base stations 13, 15, and a backhaul network 17. It shall be appreciated that the present invention has no limitation on the number of base stations that can be included in a wireless network system and the number of user equipments that can be served by a base station. Furthermore, as can be appreciated by those of ordinary skill in the art, the user equipment may be any mobile device that can communicate with a base station.

In this embodiment, the user equipment 11 does not support the FDR mode, but the base stations 13, 15 support the FDR mode. The storage 133 of the base station 13 stores the FDR configuration 130, while the storage 153 of the base station 15 stores the FDR configuration 150. The user equipment 11 is located within the coverage of the base station 13 and also within the coverage of the base station 15. The user equipment 11 connects to the base station 13 (i.e., the user equipment 11 is served by the base station 13). Additionally, the user equipment 51 is located within the coverage of the base station 13 but not within the coverage of the base station 15. The user equipment 51 connects to the base station 13 (i.e., the user equipment 51 is served by the base station 13).

Since the base station 13 supports the FDR mode, the transceiver 131 transmits the FDR configuration 130 to the user equipment 11 and receives data from the user equipment 51 on the same frequency band simultaneously according to the FDR configuration 130. During the process of transmitting the FDR configuration 130 to the user equipment 11 and receiving data from the user equipment 51 on the same frequency band simultaneously, the transceiver 131 acts according to two rules. First, the transceiver 131 performs downlink transmission with the user equipment 51, while the transceiver 131 performs uplink transmission with the user equipment 11. Second, the transceiver 131 performs uplink transmission with the user equipment 51, while the transceiver 131 performs downlink transmission with the user equipment 11. The FDR configuration 130 is then received by the transceiver 111 of the user equipment 11 from the base station 13 and stored in the storage 113. Additionally, the transceiver 151 of the base station 15 transmits the FDR configuration 150 periodically. Since the user equipment 11 is located within the coverage of the base station 15, the FDR configuration 150 is received by the transceiver 111 of the user equipment 11 from the base station 15 and stored in the storage 113. It shall be appreciated that if a base station transmits the FDR configuration through broadcasting, the one-way handshake mechanism is adopted in the transmission process. On the other hand, if a base station transmits the FDR configuration to a specific user equipment, then the one-way handshake mechanism or the two-way handshake mechanism is adopted in the transmission process.

Additionally, the transceiver 131 of the base station 13 also performs data transmission with the user equipment 11 and performs data transmission with the user equipment 51 on the same frequency band simultaneously according to the FDR configuration 130. It shall be appreciated that the transceiver 131 acts according to two rules. First, the transceiver 131 performs downlink transmission with the user equipment 51 (i.e., transmission from the transceiver 131 to the user equipment 51), while the transceiver 131 performs uplink transmission with the user equipment 11 (i.e., transmission from the user equipment 11 to the transceiver 131). Second, the transceiver 131 performs uplink transmission with the user equipment 51, while the transceiver 131 performs downlink transmission with the user equipment 11.

Since the user equipment 11 connects to the base station 13, the communication quality between the user equipment 11 and the base station 13 is measured periodically or aperiodically by the transceiver 111 of the user equipment 11 and/or the transceiver 131 of the base station 13. When the user equipment 11 and/or the base station 13 determines (e.g., the processor of the user equipment 11 and/or the processor of the base station 13 determines) that a first communication quality level is reached between the user equipment 11 and the base station 13 (e.g., the communication quality measured is lower than a first threshold), the transceiver 131 of the base station 13 initiates the user equipment 11 to establish an RRC connection with the base station 15 (which may be viewed as a target base station) and receives data from the user equipment 51 on the same frequency band simultaneously according to the FDR configuration 130. During the process of initiating the user equipment 11 to establish an RRC connection with the base station 15 and receiving data from the user equipment 51 on the same frequency band simultaneously by the transceiver 131, the transceiver 131 acts according to two rules. First, the transceiver 131 performs downlink transmission with the user equipment 51, while the transceiver 131 performs uplink transmission with the user equipment 11. Second, the transceiver 131 performs uplink transmission with the user equipment 51, while the transceiver 131 performs downlink transmission with the user equipment 11. It shall be appreciated that in some embodiments of the present invention, the transceiver 131 of the base station 13 may directly initiate the user equipment 11 to establish an RRC connection with the base station 15 and receives data from the user equipment 51 on the same frequency band simultaneously according to the FDR configuration 130 without determining whether the first communication quality level is reached between the user equipment 11 and the base station 13.

Since the user equipment 11 still connects to the base station 13 after the RRC connection with the base station 15 has been established by the user equipment 11, the user equipment 11 still performs data transmission with the base station 13. From the perspective of the base station 13, the transceiver 131 still performs data transmission with the user equipment 11 and performs data transmission with the user equipment 51 on the same frequency band simultaneously according to the FDR configuration 130. During the process of performing data transmission with the user equipment 11 and performing data transmission with the user equipment 51 on the same frequency band simultaneously, the transceiver 131 acts according to two rules. First, the transceiver 131 performs downlink transmission with the user equipment 51, while the transceiver 131 performs uplink transmission with the user equipment 11. Second, the transceiver 131 performs uplink transmission with the user equipment 51, while the transceiver 131 performs downlink transmission with the user equipment 11.

Since the user equipment 11 still connects to the base station 13, the transceiver 111 of the user equipment 11 and/or the transceiver 131 of the base station 13 still measures the communication quality between the user equipment 11 and the base station 13 periodically or aperiodically. When the user equipment 11 and/or the base station 13 determines (e.g., the processor of the user equipment 11 and/or the processor of the base station 13 determines) that a second communication quality level is reached between the user equipment 11 and the base station 13 (e.g., the communication quality measured is lower than a second threshold), this means that the communication quality therebetween further degrades. Accordingly, the transceiver 131 of the base station 13 initiates the user equipment 11 to establish a data connection with the base station 15 and receives data from the user equipment 51 on the same frequency band simultaneously according to the FDR configuration 130. During the process of initiating the user equipment 11 to establish a data connection with the base station 15 and receiving data from the user equipment 51 on the same frequency band simultaneously by the transceiver 111, the transceiver 131 acts according to two rules. First, the transceiver 111 performs downlink transmission with the user equipment 51, while the transceiver 131 performs uplink transmission with the user equipment 11. Second, the transceiver 111 performs uplink transmission with the user equipment 51, while the transceiver 131 performs downlink transmission with the user equipment 11. It shall be appreciated that in some embodiments of the present invention, the transceiver 131 of the base station 13 may directly initiate the user equipment 11 to establish a data connection with the base station 15 and receive data from the user equipment 51 on the same frequency band simultaneously according to the FDR configuration 130 without determining whether the second communication quality level is reached between the user equipment 11 and the base station 13.

After the data connection with the base station 15 has been established by the user equipment 11, the transceiver 131 of the base station 13 still performs data transmission with the user equipment 11 continuously until all data to be transmitted to the user equipment 11 in the base station 13 has been transmitted to the user equipment 11. It shall be appreciated that in this process, the transceiver 131 of the base station 13 performs data transmission with the user equipment 11 and performs data transmission with the user equipment 51 on the same frequency band simultaneously according to the FDR configuration 130. Similarly, during the process of performing data transmission with the user equipment 11 and performing data transmission with the user equipment 51 on the same frequency band simultaneously by the base station 13, the transceiver 131 acts according to two rules. First, the transceiver 131 performs downlink transmission with the user equipment 51 (i.e., transmission from the transceiver 131 to the user equipment 51), while the transceiver 131 performs uplink transmission with the user equipment 11 (i.e., transmission from the user equipment 11 to the transceiver 131). Second, the transceiver 131 performs uplink transmission with the user equipment 51, while the transceiver 131 performs downlink transmission with the user equipment 11. The user equipment 11 is served by only the base station 15 after all data to be transmitted to the user equipment 11 in the base station 13 has been transmitted to the user equipment 11.

According to the above descriptions, since the base station 13 supports the FDR mode, the base station 13 that is transmitting the FDR configuration 130 to the user equipment 11 or initiating the user equipment to establish an RRC connection or a data connection with the base station 15 may perform data transmission with other user equipments (i.e., the user equipment 15) on the same frequency band simultaneously. Additionally, after the data connection with the base station 15 has been established by the user equipment 11, the transceiver 131 of the base station 13 still performs data transmission with the user equipment 11 continuously until all data to be transmitted to the user equipment 11 in the base station 13 has been transmitted to the user equipment 11. By adopting the FDR mode, the technology disclosed in the fifth embodiment can reduce or completely eliminate the delay caused by forwarding data via the backhaul network. Resource waste that caused by allocating a wireless resource to the user equipment in advance and resource waste caused by releasing information of the user equipment from the base station too late can be reduced or even be eliminated.

Figure 6:
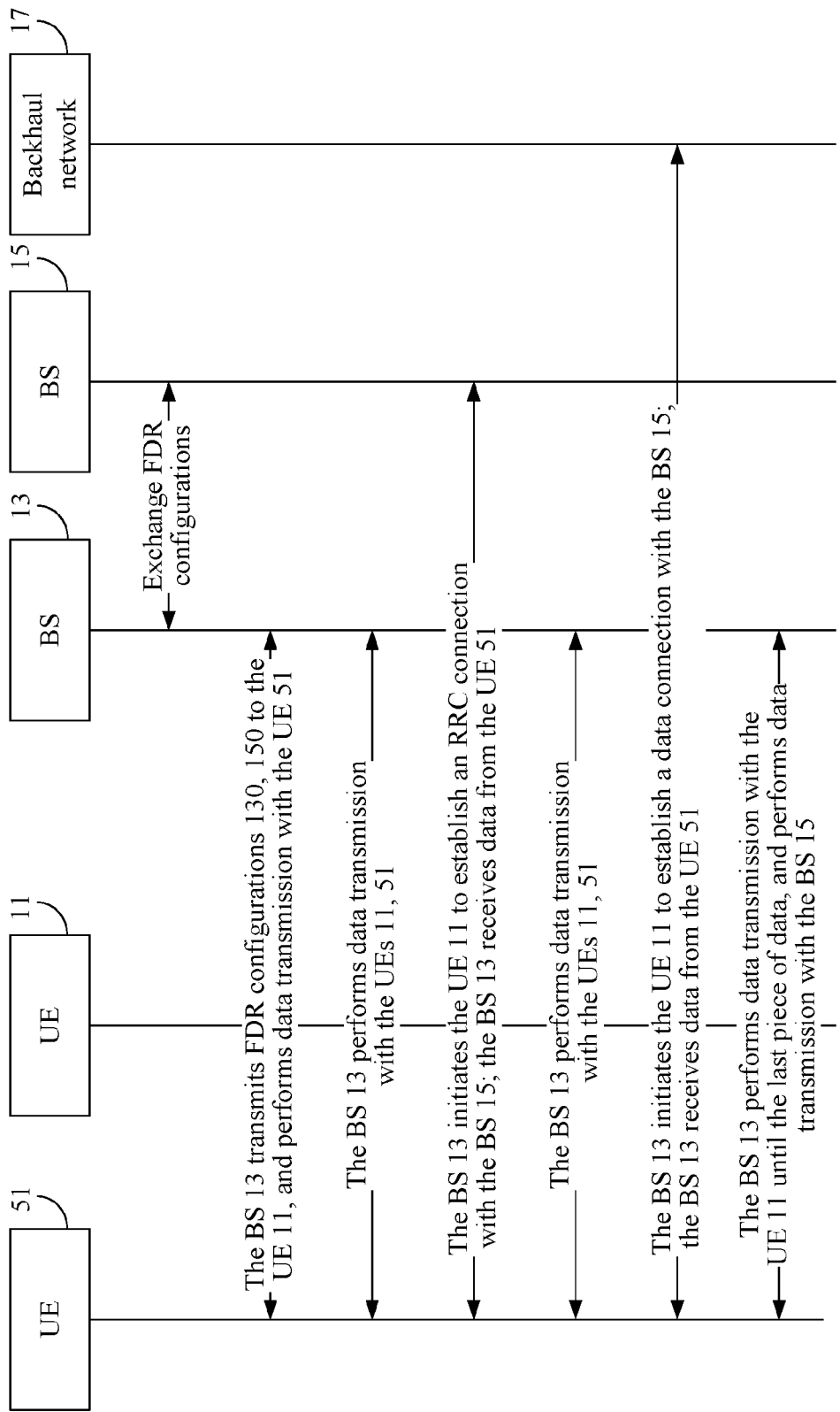
FIG. 6 is a schematic view depicting a part of signal transmissions according to the sixth embodiment of the present invention.

Please refer to FIG. 5A and FIG. 6 for the sixth embodiment of the present invention. FIG. 6 is a schematic view depicting a part of signal transmissions according to the sixth embodiment. Most operations of the sixth embodiment are similar to those of the fifth embodiment, so only differences therebetween will be detailed hereinbelow.

In this embodiment, the user equipment 11 is located within the coverage of the base station 13 and within the coverage of the base station 15. The user equipment 11 connects to the base station 13 (i.e., the user equipment 11 is served by the base station 13). The user equipment 51 is located within the coverage of the base station 13 but not within the coverage of the base station 15. The user equipment 51 connects to the base station 13 (i.e., the user equipment 51 is served by the base station 13).

In this embodiment, the user equipment 11 does not support the FDR mode, but the base stations 13, 15 support the FDR mode. The storage 133 of the base station 13 stores the FDR configuration 130, while the storage 153 of the base station 15 stores the FDR configuration 150. In this embodiment, the base station 13 and the base station 15 exchange their FDR configurations via the backhaul network 17. In other words, the base station 13 transmits the FDR configuration 130 to the base station 15 via the backhaul network 17, while the base station 15 transmits the FDR configuration 150 to the base station 13 via the backhaul network 17. Since the base station 13 supports the FDR mode, the transceiver 131 transmits the FDR configurations 130, 150 to the user equipment 11 and receives data from the user equipment 51 on the same frequency band simultaneously according to the FDR configuration 130. The FDR configurations 130, 150 are then received by the transceiver 111 of the user equipment 11 from the base station 13 and stored in the storage 113. Subsequent operations of the sixth embodiment are the same as those of the fifth embodiment, so they will not be further described herein.

Since the sixth embodiment differs from the fifth embodiment only in transmission of the FDR configurations 130, 150 and other operations are all the same as each other, the technology disclosed in the sixth embodiment can also reduce or completely eliminate the delay caused by forwarding data via the backhaul network. Resource waste that caused by allocating a wireless resource to the user equipment in advance and resource waste caused by releasing information of the user equipment from the base station too late can be reduced or even be eliminated.

Figure 7:
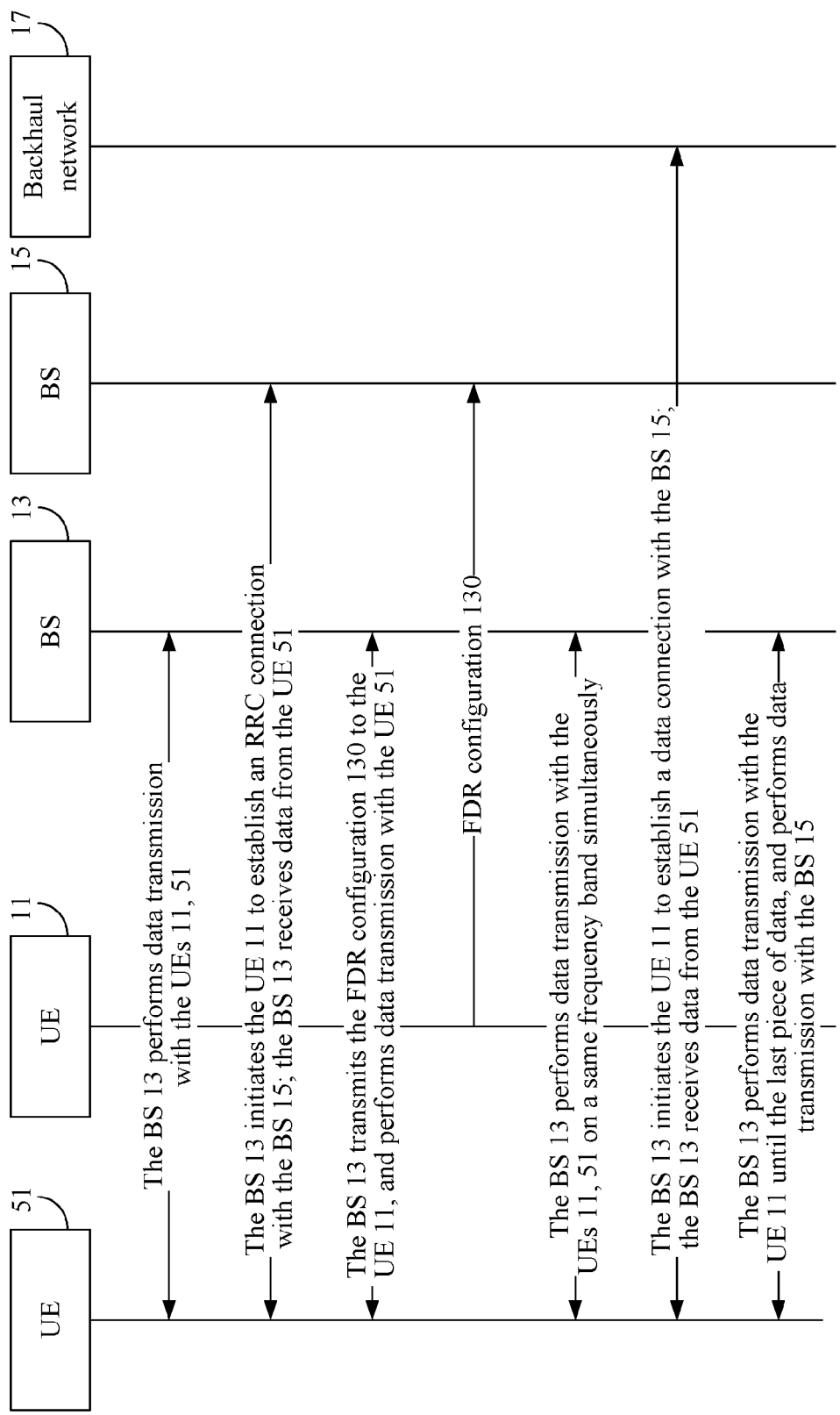
FIG. 7 is a schematic view depicting a part of signal transmissions according to the seventh embodiment of the present invention.

Please refer to FIG. 5A and FIG. 7 for the seventh embodiment of the present invention. FIG. 7 is a schematic view depicting a part of signal transmissions according to the seventh embodiment. Most operations of the seventh embodiment are similar to those of the fifth embodiment, so only the differences therebetween will be detailed hereinbelow.

In this embodiment, the user equipment 11 is located within the coverage of the base station 13 and within the coverage of the base station 15. The user equipment 11 connects to the base station 13 (i.e., the user equipment 11 is served by the base station 13). The user equipment 51 is located within the coverage of the base station 13 but not within the coverage of the base station 15. The user equipment 51 connects to the base station 13 (i.e., the user equipment 51 is served by the base station 13). The user equipment 11 does not support the FDR mode, but the base stations 13, 15 support the FDR mode. The storage 133 of the base station 13 stores the FDR configuration 130, while the storage 153 of the base station 15 stores the FDR configuration 150.

Since the base station 13 supports the FDR mode, the transceiver 131 thereof performs data transmission with the user equipment 11 and performs data transmission with the user equipment 51 on the same frequency band simultaneously according to the FDR configuration 130.

The transceiver 111 of the user equipment 11 and/or the transceiver 131 of the base station 13 measures the communication quality between the user equipment 11 and the base station 13 periodically or aperiodically. When a first communication quality level is reached between the user equipment 11 and the base station 13 (e.g., the communication quality measured is lower than a first threshold), the transceiver 131 of the base station 13 initiates the user equipment 11 to establish an RRC connection with the base station 15 and receives data from the user equipment 51 on the same frequency band simultaneously according to the FDR configuration 130. It shall be appreciated that in some embodiments of the present invention, the transceiver 131 of the base station 13 may directly initiate the user equipment 11 to establish an RRC connection with the base station 15 and receive data from the user equipment 51 on the same frequency band simultaneously according to the FDR configuration 130 without determining whether a first communication quality level is reached between the user equipment 11 and the base station 13.

In the process of establishing the RRC connection with the base station 15 by the user equipment 11, the transceiver 151 of the base station 15 may transmit the FDR configuration 150 to the user equipment 11 together. The FDR configuration 150 is received by the transceiver 111 of the user equipment 11. Additionally, the transceiver 131 of the base station 13 transmits the FDR configuration 130 to the user equipment 11 and receives data from the user equipment 51 on the same frequency band simultaneously according to the FDR configuration 130. The FDR configuration 130 is received by the transceiver 111 of the user equipment 11 from the base station 13 and stored in the storage 113. Then, the transceiver 111 of the user equipment 11 transmits the FDR configuration 130 to the base station 15 so that the base station 15 can learn the FDR configuration 130 of the base station 13. Subsequent operations of the seventh embodiment are the same as those of the fifth embodiment, so they will not be further described herein.

Since the seventh embodiment differs from the fifth embodiment only in transmission of the FDR configurations 130, 150 and all other operations are the same, the technology disclosed in the seventh embodiment can also reduce or completely eliminate the delay caused by forwarding data via the backhaul network. In addition, resource waste that caused by allocating a wireless resource to the user equipment in advance and resource waste caused by releasing information of the user equipment from the base station too late can be reduced or even be eliminated.

Figure 8:
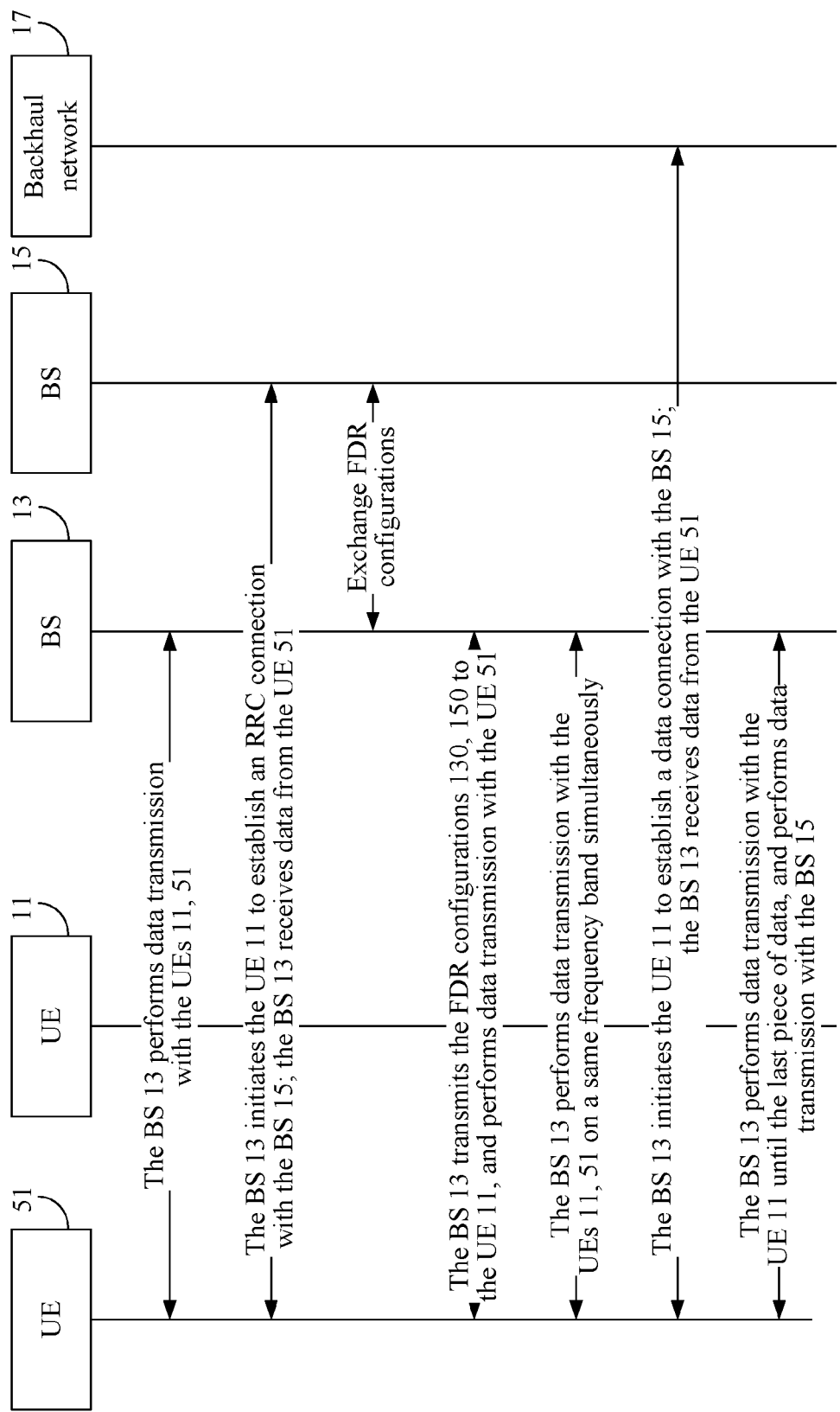
FIG. 8 is a schematic view depicting a part of signal transmissions according to the eighth embodiment of the present invention.

Please refer to FIG. 5A and FIG. 8 for the eighth embodiment of the present invention. FIG. 8 is a schematic view depicting a part of signal transmissions according to the eighth embodiment. Most operations of the eighth embodiment are similar to those of the fifth embodiment, so only the differences therebetween will be detailed hereinbelow.

In this embodiment, the user equipment 11 is located within the coverage of the base station 13 and also within the coverage of the base station 15. The user equipment 11 connects to the base station 13 (i.e., the user equipment 11 is served by the base station 13). The user equipment 51 is located within the coverage of the base station 13 but not within the coverage of the base station 15. The user equipment 51 connects to the base station 13 (i.e., the user equipment 51 is served by the base station 13). The user equipment 11 does not support the FDR mode, but the base stations 13, 15 support the FDR mode. The storage 133 of the base station 13 stores the FDR configuration 130, while the storage 153 of the base station 15 stores the FDR configuration 150.

Since the base station 13 supports the FDR mode, the transceiver 131 performs data transmission with the user equipment 11 and performs data transmission with the user equipment 51 on the same frequency band simultaneously according to the FDR configuration 130.

The transceiver 111 of the user equipment 11 and/or the transceiver 131 of the base station 13 measures the communication quality between the user equipment 11 and the base station 13 periodically or aperiodically. When a first communication quality level is reached between the user equipment 11 and the base station 13 (e.g., the communication quality measured is lower than a first threshold), the transceiver 131 of the base station 13 initiates the user equipment 11 to establish an RRC connection with the base station 15 and receives data from the user equipment 51 on the same frequency band simultaneously according to the FDR configuration 130. It shall be appreciated that in some embodiments of the present invention, the transceiver 131 of the base station 13 may directly initiate the user equipment 11 to establish an RRC connection with the base station 15 and receive data from the user equipment 51 on the same frequency band simultaneously according to the FDR configuration 130 without determining whether a first communication quality is reached between the user equipment 11 and the base station 13.

The base station 13 and the base station 15 exchange each other's FDR configurations via the backhaul network 17. In other words, the base station 13 transmits the FDR configuration 130 to the base station 15 via the backhaul network 17, while the base station 15 transmits the FDR configuration 150 to the base station 13 via the backhaul network 17. Then, the transceiver 131 of the base station 13 transmits the FDR configurations 130, 150 to the user equipment 11 and receives data from the user equipment 51 on the same frequency band simultaneously according to the FDR configuration 130. Subsequent operations of the eighth embodiment are the same as those of the fifth embodiment, so they will not be further described herein.

Since the eighth embodiment differs from the fifth embodiment only in transmission of the FDR configurations 130, 150 and all other operations are the same, the technology disclosed in the eighth embodiment can also reduce or completely eliminate the delay caused by forwarding data via the backhaul network. In addition, resource waste that caused by allocating a wireless resource to the user equipment in advance and resource waste caused by releasing information of the user equipment from the base station too late can be reduced or even be eliminated.

Figure 9:
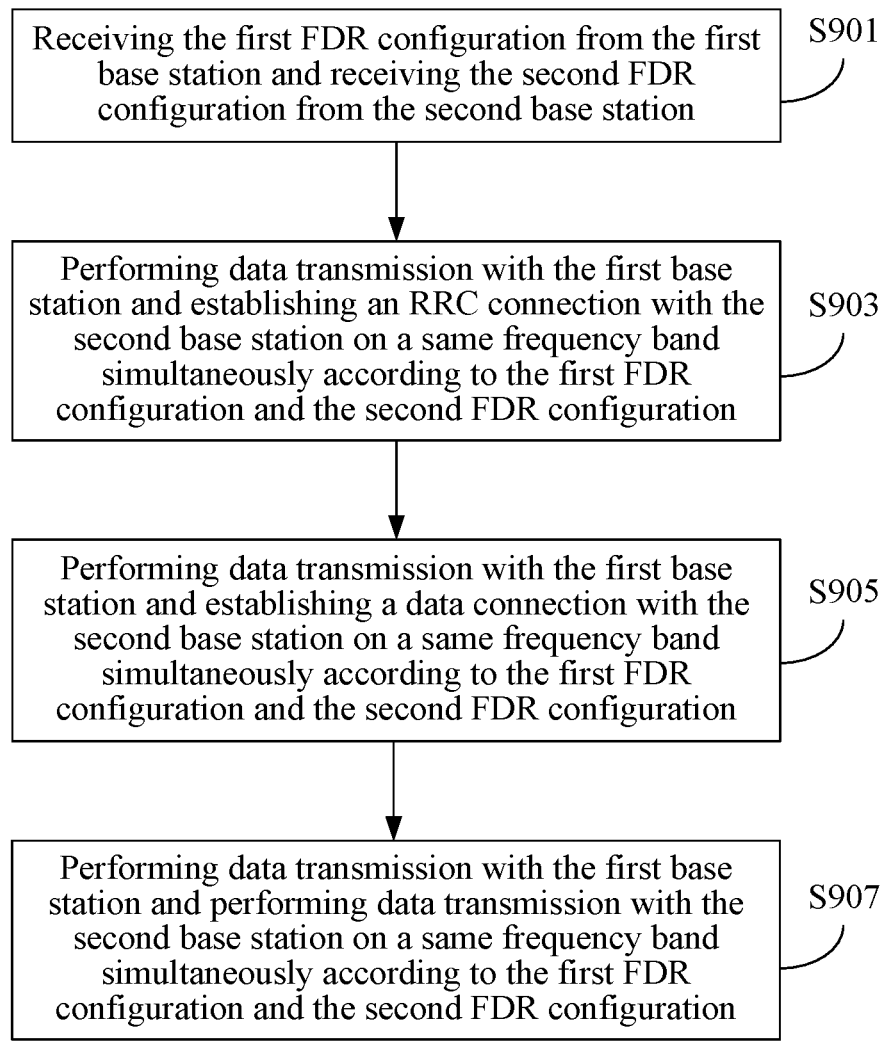
FIG. 9 is a flowchart diagram of the ninth embodiment of the present invention.

The ninth embodiment of the present invention is a data transmission method; a flowchart diagram of which is depicted in FIG. 9. The data transmission method is adapted for use in a user equipment (e.g., the user equipment 11 of the first embodiment). The user equipment is located within the coverage of a first base station and within the coverage of a second base station. The user equipment connects to the first base station. The user equipment, the first base station, and the second base station all support the FDR mode. The first base station has a first FDR configuration, while the second base station has a second FDR configuration.

First, in step S901, the first FDR configuration and the second FDR configuration are received by the user equipment. Specifically, in this embodiment, step S901 receives the first FDR configuration from the first base station and receives the second FDR configuration from the second base station. Then, in step S903, an RRC connection with the second base station is established by the user equipment. In this embodiment, step S903 performs data transmission with the first base station and establishes the RRC connection with the second base station on the same frequency band simultaneously according to the first FDR configuration and the second FDR configuration. It shall be appreciated that in some implementations of the present invention, step S903 is executed after a first communication quality level is reached between the user equipment and the first base station. The user equipment can still perform data transmission with the first base station after step S903.

Then, in step S905, data transmission with the first base station is performed and a data connection with the second base station is established by the user equipment on the same frequency band simultaneously according to the first FDR configuration and the second FDR configuration. It shall be appreciated that in some embodiments of the present invention, step S905 is executed after a second communication quality level is reached between the user equipment and the first base station. Next, in step S907, data transmission with the first base station and data transmission with the second base station are performed by the user equipment on the same frequency band simultaneously according to the first FDR configuration and the second FDR configuration. It shall be appreciated that the user equipment is served by only the second base station after all data to be transmitted to the user equipment in the first base station has been transmitted to the user equipment.

In addition to the aforesaid steps, the ninth embodiment can also execute all the operations and steps of, have the same functions as, and deliver the same technical effects as the user equipment described in the first embodiment. How the ninth embodiment executes these operations and steps, have the same functions, and deliver the same technical effects will be readily appreciated by those of ordinary skill in the art based on the explanation of the first embodiment, and thus will not be further described herein.

Figure 10:
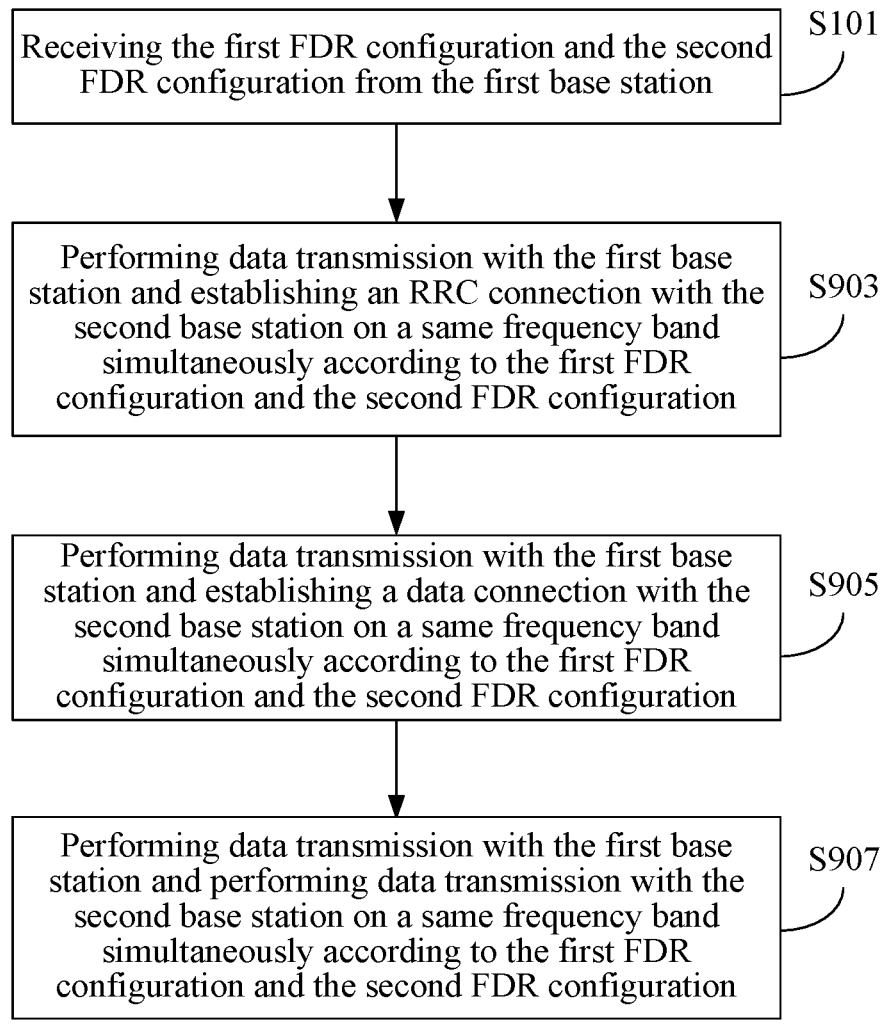
FIG. 10 is a flowchart diagram of the tenth embodiment of the present invention.

The tenth embodiment of the present invention is a data transmission method; a flowchart diagram of which is depicted in FIG. 10. The data transmission method is adapted for use in a user equipment (e.g., the user equipment 11 of the second embodiment). The user equipment is located within the coverage of a first base station and also within the coverage of a second base station. The user equipment connects to the first base station. The user equipment, the first base station, and the second base station all support the FDR mode. The first base station has a first FDR configuration, while the second base station has a second FDR configuration.

Firstly, in step S101, the first FDR configuration and the second FDR configuration are received by the user equipment. Specifically in this embodiment, step S101 receives the first FDR configuration and the second FDR configuration from the first base station. Subsequent operations of the tenth embodiment are the same as those of the ninth embodiment. Briefly speaking, steps S903, S905, and S907 are then executed in the tenth embodiment. It shall be appreciated that the user equipment is served by only the second base station after all data to be transmitted to the user equipment in the first base station has been transmitted to the user equipment.

In addition to the aforesaid steps, the tenth embodiment can also execute all the operations and steps of, have the same functions as, and deliver the same technical effects as the user equipment described in the second embodiment. How the tenth embodiment executes these operations and steps, have the same functions, and deliver the same technical effects will be readily appreciated by those of ordinary skill in the art based on the explanation of the second embodiment, and thus will not be further described herein.

Figure 11:
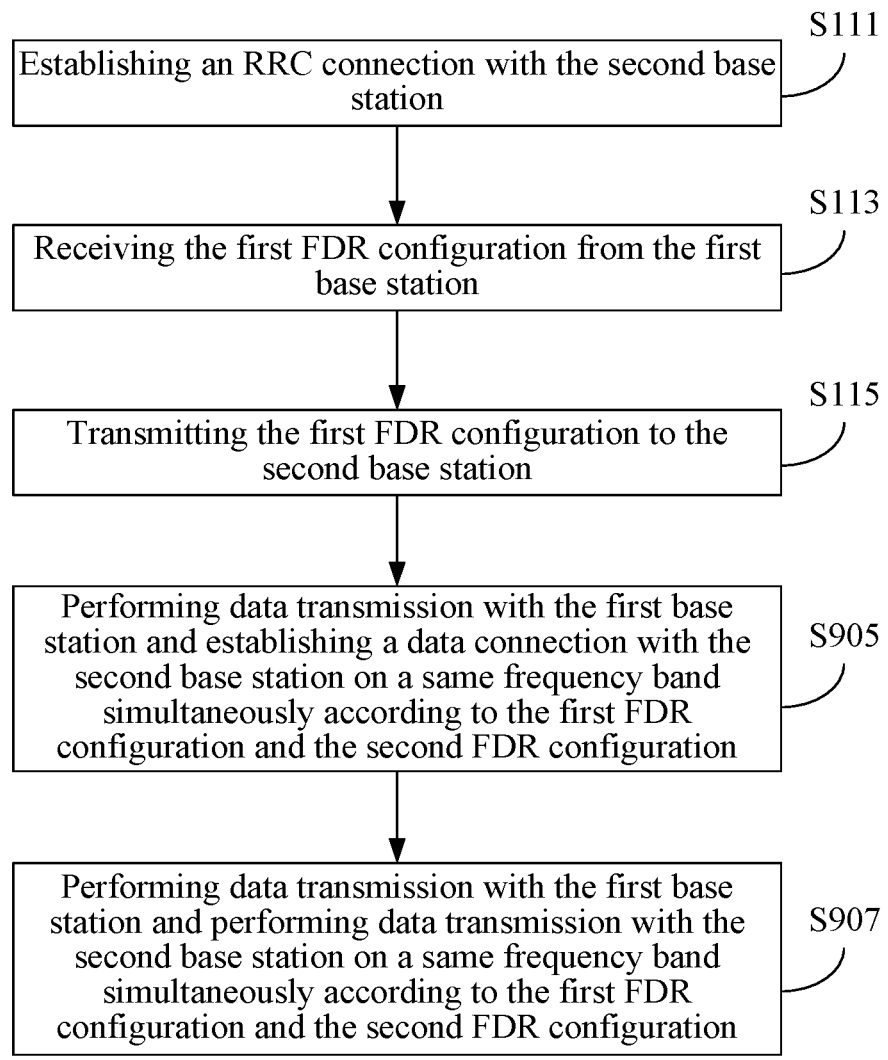
FIG. 11 is a flowchart diagram of the eleventh embodiment of the present invention.

The eleventh embodiment of the present invention is a data transmission method; a flowchart diagram of which is depicted in FIG. 11. The data transmission method is adapted for use in a user equipment (e.g., the user equipment 11 of the third embodiment). The user equipment is located within the coverage of a first base station and also within the coverage of a second base station. The user equipment connects to the first base station. The user equipment, the first base station, and the second base station all support the FDR mode. The first base station has a first FDR configuration, while the second base station has a second FDR configuration.

First, in step S111, an RRC connection with the second base station is established by the user equipment. It shall be appreciated that in some implementations of the present invention, step S111 is executed after the first communication quality level is reached between the user equipment and the first base station. During the execution of step S111 (i.e., in the process of establishing the RRC connection with the second base station by the user equipment), the user equipment may receive the second FDR configuration from the second base station together. Then, in step S113, the first FDR configuration is received by the user equipment from the first base station. Next, in step S115, the first FDR configuration is transmitted by the user equipment to the second base station.

Subsequent operations of the eleventh embodiment are the same as those of the ninth embodiment. Briefly speaking, steps S905 and S907 are then executed in the eleventh embodiment. It shall be appreciated that the user equipment is served by only the second base station after all data to be transmitted to the user equipment in the first base station has been transmitted to the user equipment.

In addition to the aforesaid steps, the eleventh embodiment can also execute all the operations and steps of, have the same functions as, and deliver the same technical effects as the user equipment described in the third embodiment. How the eleventh embodiment executes these operations and steps, have the same functions, and deliver the same technical effects will be readily appreciated by those of ordinary skill in the art based on the explanation of the third embodiment, and thus will not be further described herein.

Figure 12:
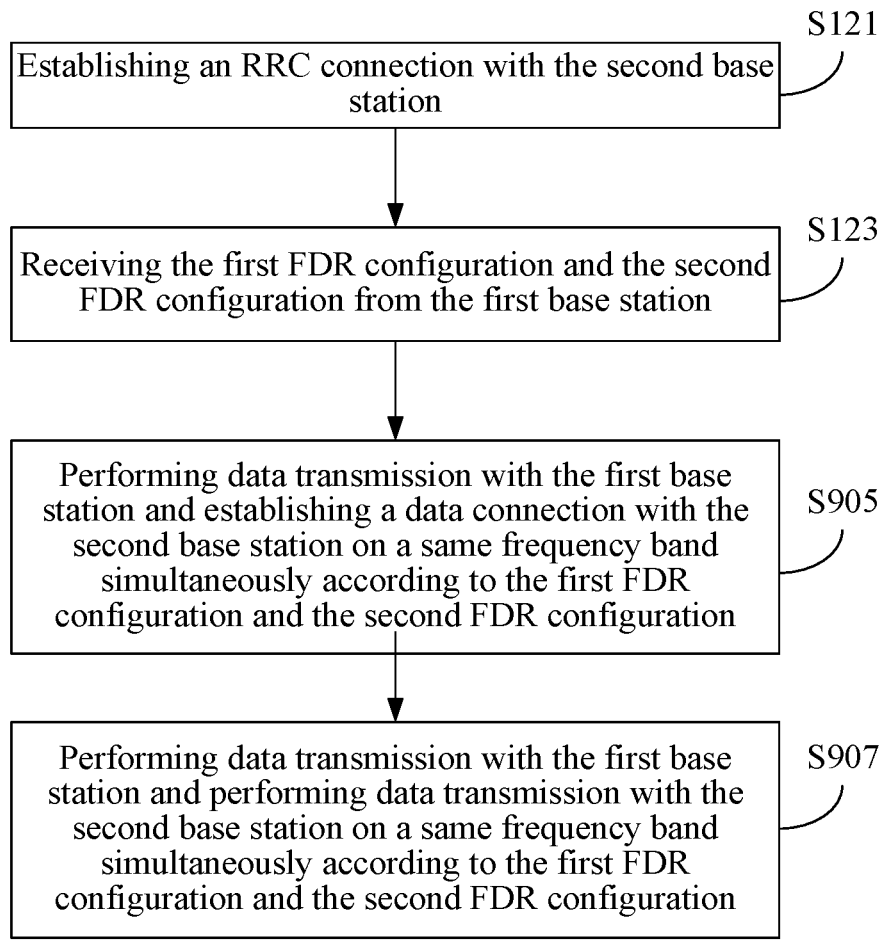
FIG. 12 is a flowchart diagram of the twelfth embodiment of the present invention.

The twelfth embodiment of the present invention is a data transmission method and a flowchart diagram of which is depicted in FIG. 12. The data transmission method is adapted for use in a user equipment (e.g., the user equipment 11 of the fourth embodiment). The user equipment is located within the coverage of a first base station and also within the coverage of a second base station. The user equipment connects to the first base station. The user equipment, the first base station, and the second base station all support the FDR mode. The first base station has a first FDR configuration, while the second base station has a second FDR configuration.

First, in step S121, an RRC connection with the second base station is established by the user equipment. It shall be appreciated that in some implementations of the present invention, the step S121 is executed after a first communication quality level is reached between the user equipment and the first base station. Then, in step S123, the first FDR configuration and the second FDR configuration are received by the user equipment from the first base station.

Subsequent operations of the twelfth embodiment are the same as those of the ninth embodiment. Briefly speaking, steps S905 and S907 are then executed in the twelfth embodiment. It shall be appreciated that the user equipment is served by only the second base station after all the data to be transmitted to the user equipment in the first base station has been transmitted to the user equipment.

In addition to the aforesaid steps, the twelfth embodiment can also execute all the operations and steps of, have the same functions as, and deliver the same technical effects as the user equipment described in the fourth embodiment. How the twelfth embodiment executes these operations and steps, have the same functions, and deliver the same technical effects will be readily appreciated by those of ordinary skill in the art based on the explanation of the fourth embodiment, and thus will not be further described herein.

Figure 13:
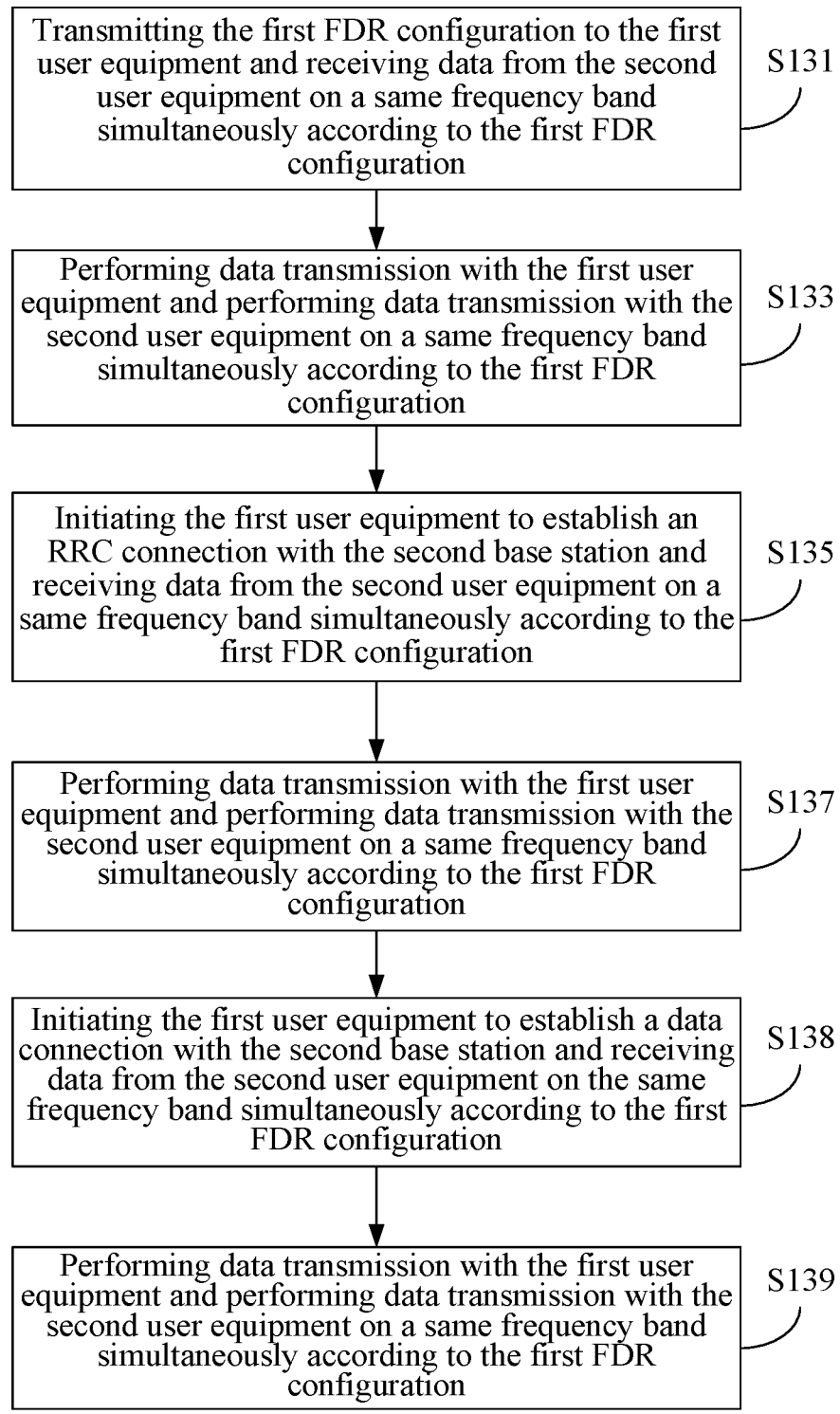
FIG. 13 is a flowchart diagram of the thirteenth embodiment of the present invention.

The thirteenth embodiment of the present invention is a data transmission method; a flowchart diagram of which is depicted in FIG. 13. The data transmission method is adapted for use in a first base station (e.g., the base station 13 of the fifth embodiment) of a wireless network system. The wireless network system comprises the first base station, a second base station, a first user equipment, a second user equipment and a backhaul network.

In this embodiment, the first user equipment does not support the FDR mode, but the first and the second base stations support the FDR mode. The first base station has a first FDR configuration, while the second base station has a second FDR configuration. The first user equipment is located within the coverage of the first base station and also within the coverage of the second base station. The first user equipment connects to the first base station. Additionally, the second user equipment is located within the coverage of the first base station but not within the coverage of the second base station, and connects to the first base station.

First, in step S131, the first FDR configuration is transmitted to the first user equipment and data is received from the second user equipment by the first base station on the same frequency band simultaneously according to the first FDR configuration. Then, in step S133, data transmission with the first user equipment and data transmission with the second user equipment are performed by the first base station on the same frequency band simultaneously according to the first FDR configuration. It shall be appreciated that in some implementations of the present invention, the step S133 may be omitted if the first user equipment and the second user equipment need not perform data transmission with the first base station.

Next, in step S135, the first base station initiates the first user equipment to establish an RRC connection with the second base station (which may be viewed as a target base station) and receives data from the second user equipment on the same frequency band simultaneously according to the first FDR configuration. It shall be appreciated that in some implementations of the present invention, the step S135 is executed after a first communication quality level is reached between the first user equipment and the first base station. The first user equipment can still perform data transmission with the first base station after step S135. Next, in step S137, data transmission with the first user equipment and data transmission with the second user equipment are performed by the first base station on the same frequency band simultaneously according to the first FDR configuration. It shall be appreciated that in some implementations of the present invention, step S137 may be omitted if the first user equipment and the second user equipment need not perform data transmission with the first base station.

Then, in step S138, the first base station initiates the first user equipment to establish a data connection with the second base station and receives data from the second user equipment on the same frequency band simultaneously according to the first FDR configuration. It shall be appreciated that in some implementations of the present invention, step S138 is executed after a second communication quality level is reached between the first user equipment and the first base station.

Afterwards, in step S139, data transmission with the first user equipment and data transmission with the second user equipment are performed by the first base station on the same frequency band simultaneously according to the first FDR configuration. It shall be appreciated that the first user equipment is served by only the second base station after all data to be transmitted to the first user equipment in the first base station has been transmitted to the first user equipment.

In addition to the aforesaid steps, the thirteenth embodiment can also execute all the operations and steps of, have the same functions as, and deliver the same technical effects as the user equipment described in the fifth embodiment. How the thirteenth embodiment executes these operations and steps, have the same functions, and deliver the same technical effects will be readily appreciated by those of ordinary skill in the art based on the explanation of the fifth embodiment, and thus will not be further described herein.

Figure 14:
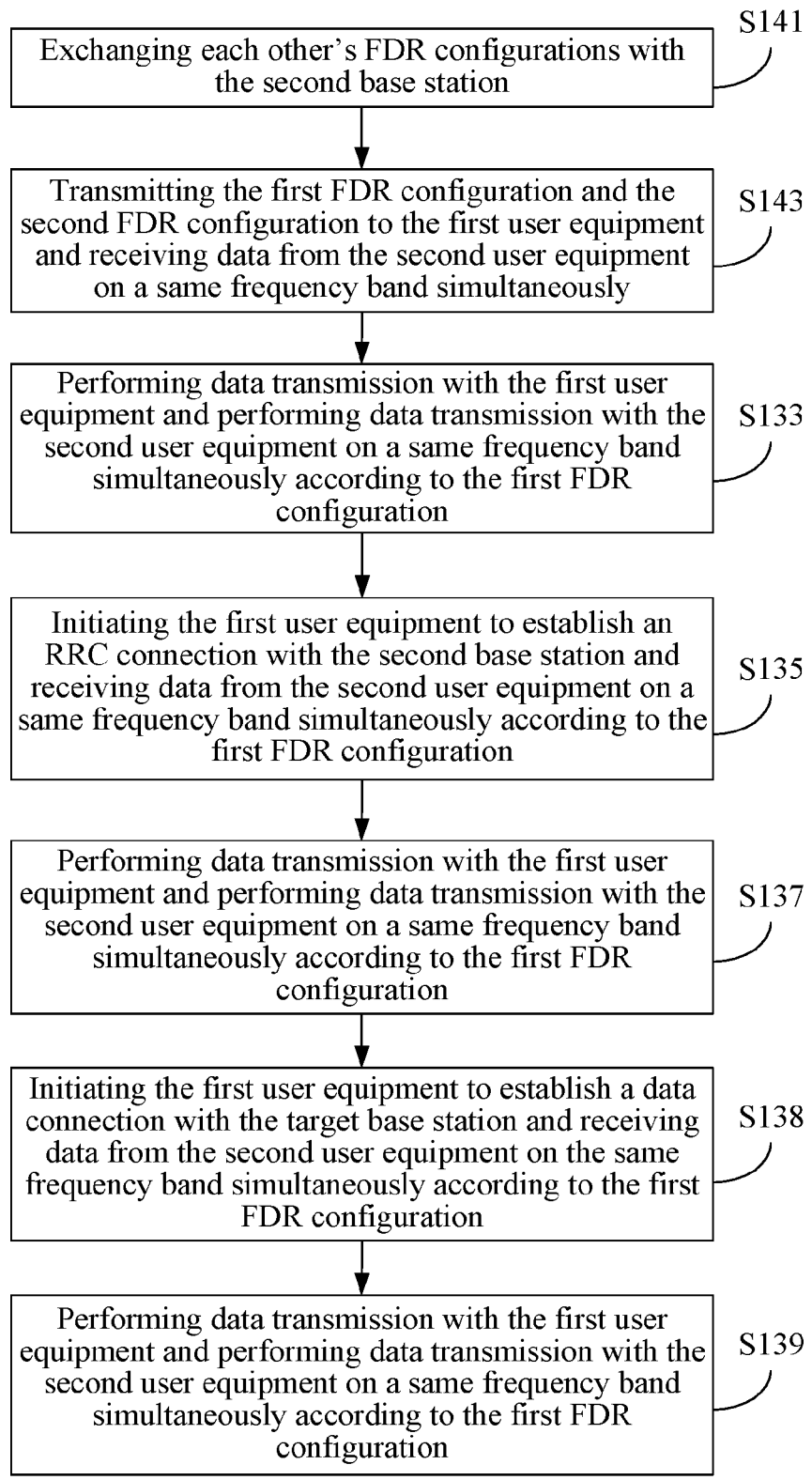
FIG. 14 is a flowchart diagram of the fourteenth embodiment of the present invention.

The fourteenth embodiment of the present invention is a data transmission method; a flowchart diagram of which is depicted in FIG. 14. The data transmission method is adapted for use in the first base station (e.g., the base station 13 of the sixth embodiment) of a wireless network system. The wireless network system comprises the first base station, second base station, first user equipment, second user equipment, and a backhaul network.

In this embodiment, the first user equipment does not support the FDR mode, but the first and the second base stations support the FDR mode. The first base station has a first FDR configuration, while the second base station has a second FDR configuration. The first user equipment is located within the coverage of the first base station and also within the coverage of the second base station. The first user equipment connects to the first base station. Additionally, the second user equipment is located within the coverage of the first base station but not within the coverage of the second base station. The second user equipment connects to the first base station.

First, in step S141, the first base station and the second base station exchange their FDR configurations via the backhaul network. In other words, the first base station transmits the first FDR configuration to the second base station via the backhaul network and receives the second FDR configuration from the second base station via the backhaul network. Then, in step S143, the first FDR configuration and the second FDR configuration are transmitted to the first user equipment and data is received from the second user equipment by the first base station on the same frequency band simultaneously.

Subsequent operations of the fourteenth embodiment are the same as those of the thirteenth embodiment. Briefly speaking, steps S133, S135, S137, S138, and S139 are then executed in the fourteenth embodiment. It shall be appreciated that the first user equipment is served by only the second base station after all data to be transmitted to the first user equipment in the first base station has been transmitted to the first user equipment.

In addition to the aforesaid steps, the fourteenth embodiment can also execute all the operations and steps of, have the same functions as, and deliver the same technical effects as the base station 13 described in the sixth embodiment. How the fourteenth embodiment executes these operations and steps, have the same functions, and deliver the same technical effects will be readily appreciated by those of ordinary skill in the art based on the explanation of the sixth embodiment, and thus will not be further described herein.

Figure 15:
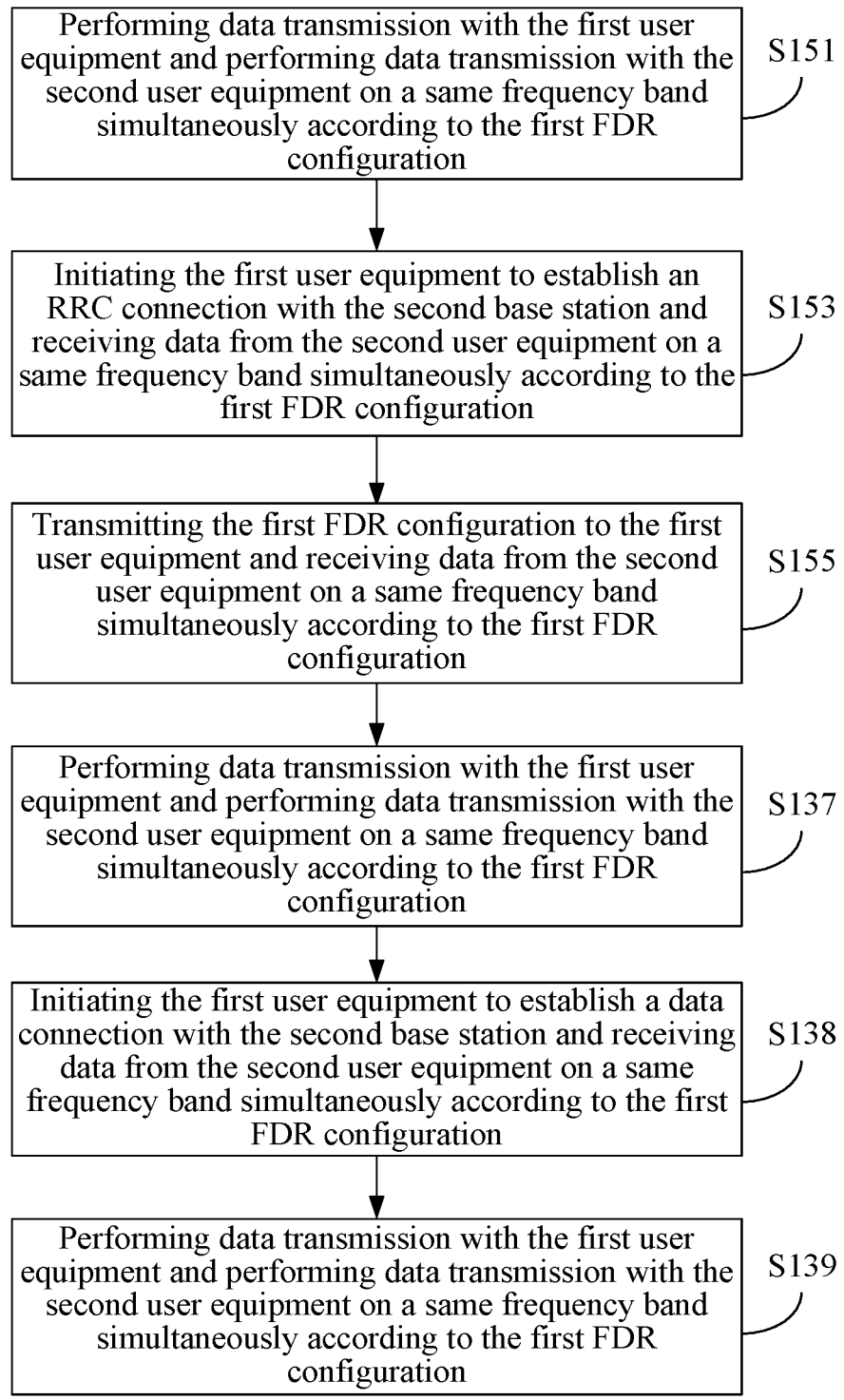
FIG. 15 is a flowchart diagram of the fifteenth embodiment of the present invention.

The fifteenth embodiment of the present invention is a data transmission method; a flowchart diagram of which is depicted in FIG. 15. The data transmission method is adapted for use in a first base station (e.g., the base station 13 of the seventh embodiment) of a wireless network system. The wireless network system comprises the first base station, a second base station, a first user equipment, a second user equipment, and a backhaul network.

In this embodiment, the first user equipment does not support the FDR mode, but the first and the second base stations support the FDR mode. The first base station has a first FDR configuration, while the second base station has a second FDR configuration. The first user equipment is located within the coverage of the first base station and also within the coverage of the second base station. The first user equipment connects to the first base station. Additionally, the second user equipment is located within the coverage of the first base station but not within the coverage of the second base station. The second user equipment connects to the first base station.

First, in step S151, data transmission with the first user equipment and data transmission with the second user equipment are performed by the first base station on the same frequency band simultaneously according to the first FDR configuration. Then, in step S153, the first base station initiates the first user equipment to establish an RRC connection with the second base station (which may be viewed as a target base station) and receives data from the second user equipment on the same frequency band simultaneously according to the first FDR configuration. It shall be appreciated that in some implementations of the present invention, step S153 is executed after a first communication quality level is reached between the first user equipment and the first base station. The first user equipment can still perform data transmission with the first base station after step S153. Next, in step S155, the first FDR configuration is transmitted to the first user equipment and data is received from the second user equipment by the first base station on a same frequency band simultaneously according to the first FDR configuration.

Subsequent operations of the fifteenth embodiment are the same as those of the thirteenth embodiment. Briefly speaking, the steps S137, S138 and S139 are then executed in the fifteenth embodiment. It shall be appreciated that, the first user equipment is served by only the second base station after all data to be transmitted to the first user equipment in the first base station has been transmitted to the first user equipment.

In addition to the aforesaid steps, the fifteenth embodiment can also execute all the operations and steps of, have the same functions as, and deliver the same technical effects as the base station 13 described in the seventh embodiment. How the fifteenth embodiment executes these operations and steps, have the same functions, and deliver the same technical effects will be readily appreciated by those of ordinary skill in the art based on the explanation of the seventh embodiment, and thus will not be further described herein.

Figure 16:
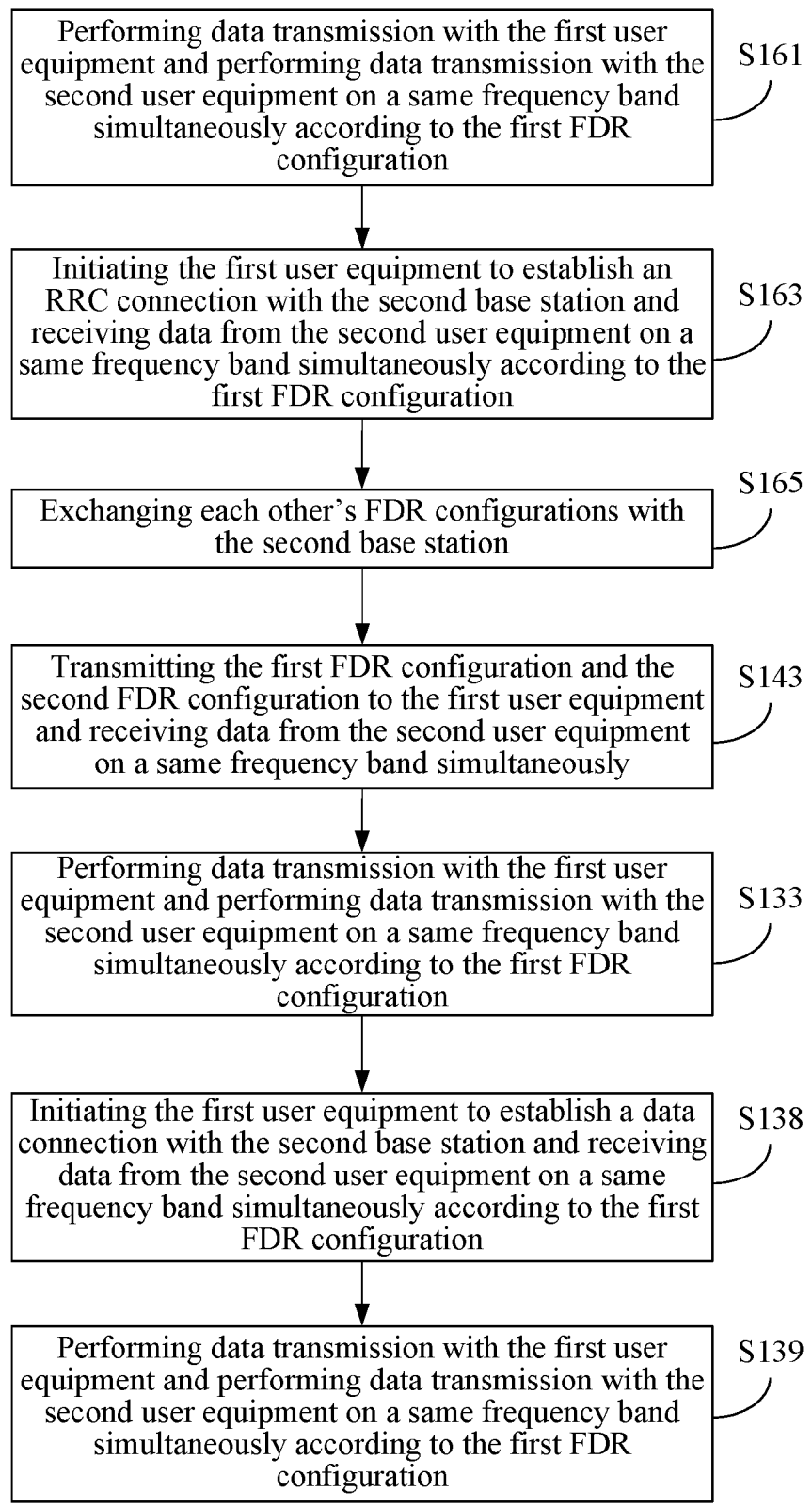
FIG. 16 is a flowchart diagram of the sixteenth embodiment of the present invention.

The sixteenth embodiment of the present invention is a data transmission method; a flowchart diagram of which is depicted in FIG. 16. The data transmission method is adapted for use in a first base station (e.g., the base station 13 of the eighth embodiment) of a wireless network system. The wireless network system comprises the first base station, second base station, first user equipment, second user equipment and a backhaul network.

In this embodiment, the first user equipment does not support the FDR mode, but the first and the second base stations support the FDR mode. The first base station has a first FDR configuration, while the second base station has a second FDR configuration. The first user equipment is located within the coverage of the first base station and also within the coverage of the second base station, and connects to the first base station. Additionally, the second user equipment is located within the coverage of the first base station but not within the coverage of the second base station, and connects to the first base station.

First, in step S161, data transmission with the first user equipment and data transmission with the second user equipment are performed by the first base station on the same frequency band simultaneously according to the first FDR configuration. Then, in step S163, the first base station initiates the first user equipment to establish an RRC connection with the second base station (which may be viewed as a target base station) and receives data from the second user equipment on the same frequency band simultaneously according to the first FDR configuration. It shall be appreciated that in some implementations of the present invention, step S163 is executed after a first communication quality level is reached between the first user equipment and the first base station.

Next, in step S165, the first base station and the second base station exchange each other's FDR configurations via the backhaul network. In other words, the first base station transmits the first FDR configuration to the second base station via the backhaul network, and receives the second FDR configuration from the second base station via the backhaul network. Then, steps S143, S133, S138 and S139 are executed in the sixteenth embodiment. It shall be appreciated that the first user equipment is served by only the second base station after all data to be transmitted to the first user equipment in the first base station has been transmitted to the first user equipment.

In addition to the aforesaid steps, the sixteenth embodiment can also execute all the operations and steps of, have the same functions as, and deliver the same technical effects as the base station 13 described in the eighth embodiment. How the sixteenth embodiment executes these operations and steps, have the same functions, and deliver the same technical effects will be readily appreciated by those of ordinary skill in the art based on the explanation of the eighth embodiment, and thus will not be further described herein.

As can be known from the above descriptions, according to the technology disclosed in the present invention, if a user equipment, first base station, and target base station (i.e., a second base station) all supports the FDR mode, then, during the process of establishing an RRC connection and a data connection with the second base station, the user equipment can perform data transmission with the first base station on the same frequency band simultaneously. Additionally, after the data connection with the second base station has been established by the user equipment, the user equipment can still perform data transmission with the first base station and perform data transmission with the second base station on the same frequency band simultaneously. Then, the user equipment is served by only the second base station after all data to be transmitted to the user equipment in the first base station has been transmitted to the user equipment. By adopting the FDR mode, the present invention can reduce or completely eliminate the delay caused by forwarding data via the backhaul network. Resource waste that caused by allocating a wireless resource to the user equipment in advance and resource waste caused by releasing information of the user equipment from the base station too late can be reduced or even be eliminated From the perspective of the first base station, in the process of transmitting the first FDR configuration to the user equipment and in the process of initiating the user equipment to establish an RRC connection and a data connection with the second base station, the first base station can perform data transmission with other user equipments on the same frequency band simultaneously. Additionally, after the data connection with the second base station has been established, the first base station can still perform data transmission with the user equipment continuously until all data to be transmitted to the user equipment in the first base station has been transmitted. By adopting the FDR mode, the present invention can reduce or completely eliminate the delay caused by forwarding data via the backhaul network. In addition, resource waste that caused by allocating a wireless resource to the user equipment in advance and resource waste caused by releasing information of the user equipment from the base station too late can be reduced or even be eliminated.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A user equipment (UE), comprising:
  a transceiver, connecting to a first base station (BS) and being configured to receive a first Full Duplex Radio (FDR) configuration of the first base station and a second FDR configuration of a second base station; and
  a storage, being electrically connected to the transceiver and being stored with the first FDR configuration and the second FDR configuration;
  wherein the transceiver further establishes a Radio Resource Control (RRC) connection with the second base station, performs data transmission with the first base station and establishes a data connection with the second base station on a same frequency band simultaneously according to the first FDR configuration and the second FDR configuration, and further performs data transmission with the first base station and performs data transmission with the second base station on the same frequency band simultaneously according to the first FDR configuration and the second FDR configuration, wherein when the transceiver performs uplink transmission with the first base station according to the first FDR configuration and the second FDR configuration, the transceiver performs downlink transmission with the second base station simultaneously and when the transceiver performs downlink transmission with the first base station according to the first FDR configuration and the second FDR configuration, the transceiver performs uplink transmission with the second base station simultaneously.

2. The user equipment of claim 1, wherein the transceiver receives the first FDR configuration from the first base station and receives the second FDR configuration from the second base station.

3. The user equipment of claim 1, wherein the transceiver receives both the first FDR configuration and the second FDR configuration from the first base station.

4. The user equipment of claim 1, wherein the transceiver receives the first FDR configuration from the first base station and receives the second FDR configuration from the second base station and the transceiver further transmits the first FDR configuration to the second base station.

5. The user equipment of claim 1, wherein the transceiver performs data transmission with the first base station and establishes the RRC connection with the second base station on the same frequency band simultaneously according to the first FDR configuration and the second FDR configuration.

6. The user equipment of claim 1, wherein the transceiver establishes the RRC connection with the second base station when a first communication quality level is reached between the user equipment and the first base station and the transceiver establishes the data connection with the second base station when a second communication quality level is reached between the user equipment and the first base station.

7. A base station, comprising:
a storage, being stored with a first FDR configuration; and
a transceiver, being electrically connected to the storage, connecting to a first user equipment and a second user equipment, and being configured to transmit the first FDR configuration to the first user equipment and receive data from the second user equipment on a same frequency band simultaneously according to the first FDR configuration, initiates the first user equipment to establish an RRC connection with a target base station and receives data from the second user equipment on the same frequency band simultaneously, and initiates the first user equipment to establish a data connection with the target base station and receives data from the second user equipment on the same frequency band simultaneously, wherein when the transceiver performs uplink transmission with the first user equipment according to the first FDR configuration and a second FDR configuration, the transceiver performs downlink transmission with the second user equipment simultaneously and when the transceiver performs downlink transmission with the first user equipment according to the first FDR configuration and the second FDR configuration, the transceiver performs the uplink transmission with the second user equipment simultaneously.

8. The base station of claim 7, wherein the transceiver further receives a second FDR configuration from the target base station and when the transceiver transmits the first FDR configuration to the first user equipment, the transceiver also transmits the second FDR configuration to the first user equipment.

9. The base station of claim 7, wherein the transceiver further performs data transmission with the first user equipment and performs data transmission with the second user equipment on the same frequency band simultaneously according to the first FDR configuration.

10. The base station of claim 7, wherein the transceiver initiates the first user equipment to establish the RRC connection with the target base station when a first communication quality level is reached between the first user equipment and the base station and the transceiver initiates the first user equipment to establish the data connection with the target base station when a second communication quality level is reached between the first user equipment and the base station.

11. A data transmission method for a user equipment, the user equipment connecting to a first base station, and the data transmission method comprising the following steps of:
 (a) receiving a first FDR configuration of the first base station and a second FDR configuration of a second base station by the user equipment;
 (b) establishing an RRC connection with the second base station by the user equipment;
 (c) performing data transmission with the first base station and establishing a data connection with the second base station on a same frequency band simultaneously by the user equipment according to the first FDR configuration and the second FDR configuration; and
 (d) performing data transmission with the first base station and performing data transmission with the second base station on the same frequency band simultaneously by the user equipment according to the first FDR configuration and the second FDR configuration;
 wherein when the user equipment performs uplink transmission with the first base station according to the first FDR configuration and the second FDR configuration, the user equipment performs downlink transmission with the second base station simultaneously and when the user equipment performs downlink transmission with the first base station according to the first FDR configuration and the second FDR configuration, the user equipment performs uplink transmission with the second base station simultaneously.

12. The data transmission method of claim 11, wherein the step (a) receives the first FDR configuration from the first base station and receive the second FDR configuration from the second base station.

13. The data transmission method of claim 11, wherein the step (a) receives the first FDR configuration and the second FDR configuration from the first base station.

14. The data transmission method of claim 11, wherein the step (a) receives the first FDR configuration from the first base station and receive the second FDR configuration from the second base station and the data transmission method further comprises the following step of:
 transmitting the first FDR configuration to the second base station.

15. The data transmission method of claim 11, wherein the step (b) performs data transmission with the first base station and establishes the RRC connection with the second base station on the same frequency band simultaneously according to the first FDR configuration and the second FDR configuration.

16. The data transmission method of claim 11, wherein the step (b) establishes the RRC connection with the second base station when a first communication quality level is reached between the user equipment and the first base station and the step (c) establishes the data connection with the second base station when a second communication quality level is reached between the user equipment and the first base station.

17. A data transmission method for a base station, the base station having a first FDR configuration and connecting to a first user equipment and a second user equipment, the data transmission method comprising the following steps of:
 (a) transmitting the first FDR configuration to the first user equipment and receiving data from the second user equipment on a same frequency band simultaneously by the base station according to the first FDR configuration;
 (b) initiating the first user equipment to establish an RRC connection with a target base station and receiving data from the second user equipment on the same frequency band simultaneously by the base station according to the first FDR configuration; and
 (c) initiating the first user equipment to establish a data connection with the target base station and receiving data from the second user equipment on the same frequency band simultaneously by the base station according to the first FDR configuration,
 wherein when the base station performs uplink transmission with the first user equipment according to the first FDR configuration and the second FDR configuration, the base station performs downlink transmission with the second user equipment simultaneously and when the base station performs downlink transmission with the first user equipment according to the first FDR configuration and the second FDR configuration, the base station performs the uplink transmission with the second user equipment simultaneously.

18. The data transmission method of claim 17, further comprising the following step of:
 receiving a second FDR configuration from the target base station;
 wherein when transmitting the first FDR configuration to the first user equipment in the step (a), the second FDR configuration is also transmitted to the first user equipment.

19. The data transmission method of claim 17, further comprising the following step of:
 performing data transmission with the first user equipment and performing data transmission with the second user equipment on the same frequency band simultaneously according to the first FDR configuration.

20. The data transmission method of claim 17, wherein the step (b) initiates the first user equipment to establish the RRC connection with the target base station when a first communication quality level is reached between the first user equipment and the base station and the step (c) initiates the first user equipment to establish the data connection with the target base station when a second communication quality level is reached between the first user equipment and the base station.

* * * * *